US012568404B2

(12) United States Patent (10) Patent No.: US 12,568,404 B2
Elmali et al. (45) Date of Patent: Mar. 3, 2026

(54) FREQUENCY PRIORITIZATION FOR TERMINAL DEVICES RECEIVING A MULTICAST BROADCAST SERVICE

(71) Applicant: Nokia Technologies Oy, Espoo (FI)

(72) Inventors: Ugur Baran Elmali, Munich (DE);
Horst Thomas Belling, Munich (DE);
Philippe Godin, Massy (FR);
Bighnaraj Panigrahi, Bangalore (IN)

(73) Assignee: NOKIA TECHNOLOGIES OY,
Espoo (FI)

( * ) Notice: Subject to any disclaimer, the term of this
patent is extended or adjusted under 35
U.S.C. 154(b) by 0 days.

(21) Appl. No.: 18/912,739

(22) Filed: Oct. 11, 2024

(65) Prior Publication Data

US 2025/0142419 A1 May 1, 2025

Related U.S. Application Data

(63) Continuation of application No. 18/897,673, filed on
Sep. 26, 2024.

(30) Foreign Application Priority Data

Oct. 30, 2023 (GB) ...................................... 2316550

(51) Int. Cl.
*H04W 36/00* (2009.01)
(52) U.S. Cl.
CPC ... *H04W 36/0007* (2018.08); *H04W 36/0058*
(2018.08); *H04W 36/008355* (2023.05)
(58) Field of Classification Search
CPC ........... H04W 4/06; H04W 8/22; H04W 8/24;
H04W 28/00; H04W 28/02;
(Continued)

(56) References Cited

U.S. PATENT DOCUMENTS

2017/0295005 A1* 10/2017 Lee .................. H04W 36/0055
2019/0082352 A1* 3/2019 Hua ...................... H04W 76/15
(Continued)

FOREIGN PATENT DOCUMENTS

GB 2617553 A 10/2023
WO WO-2022082486 A1 * 4/2022
(Continued)

OTHER PUBLICATIONS

"3rd Generation Partnership Project; Technical Specification Group
Services and System Aspects; Architectural enhancements for 5G
multicast-broadcast services; Stage 2 (Release 18)", 3GPP TS
23.247, V18.2.0, Jun. 2023, pp. 1-135.
(Continued)

*Primary Examiner* — Matthew W Genack
(74) *Attorney, Agent, or Firm* — SQUIRE PATTON
BOGGS (US) LLP

(57) ABSTRACT

According to an aspect, there is provided an apparatus
configured to perform the following. The apparatus receives
a service announcement of a multicast broadcast service.
The apparatus receives, in the service announcement and/or
in at least one message following the service announcement,
at least one indication indicating support for all or at least
some reduced capability terminal devices for the multicast
broadcast service. The apparatus performs a cell reselection
process based on cell measurements and the at least one
indication.

20 Claims, 9 Drawing Sheets

(58) Field of Classification Search
CPC ......... H04W 28/0215; H04W 36/0005; H04W
36/0007; H04W 36/0058; H04W 36/0083;
H04W 36/00835; H04W 36/008355;
H04W 36/026
See application file for complete search history.

(56) References Cited

U.S. PATENT DOCUMENTS

| | | | |
|---|---|---|---|
| 2022/0338070 A1 | 10/2022 | Wang et al. | |
| 2022/0361059 A1 | 11/2022 | He et al. | |
| 2023/0209315 A1 | 6/2023 | Shrivastava et al. | |
| 2024/0040661 A1* | 2/2024 | Baek | H04W 4/06 |
| 2024/0106724 A1* | 3/2024 | Jung | H04L 41/5067 |
| 2024/0224132 A1* | 7/2024 | Gummadi | H04W 36/08 |
| 2025/0031100 A1* | 1/2025 | Santhanam | H04W 36/00222 |
| 2025/0039905 A1* | 1/2025 | Huang | H04L 5/0094 |

FOREIGN PATENT DOCUMENTS

| | | |
|---|---|---|
| WO | 2022/155016 A1 | 7/2022 |
| WO | 2022/205291 A1 | 10/2022 |
| WO | 2023/013609 A1 | 2/2023 |
| WO | 2023/068263 A1 | 4/2023 |

OTHER PUBLICATIONS

"RedCap CFR for MBS broadcast [RedCapMBS_Bcast]", 3GPP TSG-RAN WG2 Meeting #122, R2-2305955, Qualcomm Incorporated, May 22-26, 2023, 5 pages.

"RedCap CFR for MBS broadcast", 3GPP TSG-RAN2 Meeting #121, R2-2300797, Agenda: 8.20.2 , Qualcomm, R2-2300797, Feb. 27- Mar. 4, 2023, pp. 1-5.

"Open Issues on RedCap CFR for MBS broadcast", 3GPP TSG-RAN WG2 Meeting #122, R2-2304779, Agenda: 7.24.2, CATT, May 22-26, 2023, 3 pages.

"Discussion on the CFR for Redcap UE", 3GPP TSG-RAN WG2 Meeting #122, R2-2304822, Agenda: 7.24.2, Huawei, May 22-26, 2023, pp. 1-5.

"Correction on RRC for Redcap CFR", 3GPP TSG-RAN2 Meeting #122, R2-2304823, Huawei, May 22-26, 2023, 4 pages.

"Correction options on RedCap MBS Broadcast reception in TEI18", 3GPP TSG-RAN WG2 Meeting #122, R2-2305665, Agenda: 7.24. 2, ZTE, May 22-26, 2023, pp. 1-20.

"Discussion on Separate RedCap CFR for MBS Broadcast", 3GPP TSG-RAN2 Meeting #122, R2-2305954, Agenda: 7.24.2, Qualcomm, May 22-26, 2023, 9 pages.

"Msc-generator", Sourceforge, Retrieved on Sep. 17, 2024, Webpage available at :https://sourceforge.net/projects/msc-generator/.

"3rd Generation Partnership Project; Technical Specification Group Radio Access Network; NR; NR and NG-RAN Overall Description; Stage 2 (Release 17)", 3GPP TS 38.300, V17.5.0, Jun. 2023, pp. 1-211.

"3rd Generation Partnership Project; Technical Specification Group Core Network and Terminals; Numbering, addressing and identification; (Release 18)", 3GPP TS 23.003, V18.3.0, Sep. 2023, pp. 1-155.

"Discussion on MBS CFR for Redcap UE", 3GPP TSG-RAN WG2 Meeting #121bis-e, R2-2302495, Agenda: 7.24, NEC, Apr. 17-26, 2023, pp. 1-3.

"TEI18 RedCap UE MBS broadcast reception", 3GPP TSG-RAN WG3 Meeting #121, R3-234213, Agenda: 31.1, ZTE, Aug. 21-25, 2023, pp. 1-9.

"3rd Generation Partnership Project; Technical Specification Group Radio Access Network; NR; User Equipment (UE) radio access capabilities (Release 17)", 3GPP TS 38.306, V17.6.0, Sep. 2023, pp. 1-257.

"3rd Generation Partnership Project; Technical Specification Group Radio Access Network; NR; User Equipment (UE procedures in Idle mode and RRC Inactive state (Release 17)", 3GPP TS 38.304, V17.6.0, Sep. 2023, pp. 1-53.

Search Report received for corresponding United Kingdom Patent Application No. 2316546.7, dated Apr. 19, 2024, 4 pages.

"Reply LS on RedCap UE MBS Broadcast reception", 3GPP TSG RAN3 Meeting#122, R3-237153, SA WG2, Nov. 13-17, 2023, 2 pages.

Search Report received for corresponding United Kingdom Patent Application No. 2316550.9, dated May 1, 2024, 2 pages.

Search Report received for corresponding United Kingdom Patent Application No. 2316548.3, dated May 1, 2024, 3 pages.

"Discussion on multicast reception in RRC_INACTIVE CP issues", 3GPP TSG-RAN WG2 Meeting #122, R2-2305632, Agenda: 7.11. 2.1, CMCC, May 22-26, 2023, 12 pages.

"Control plane aspects of multicast reception in RRC_INACTIVE state", 3GPP TSG-RAN WG2 Meeting #122, R2-2306363, Agenda: 7.11.2.1, Nokia, May 22-26, 2023, 13 pages.

International Search Report and Written Opinion received for corresponding Patent Cooperation Treaty Application No. PCT/ EP2024/073389, dated Oct. 24, 2024, 15 pages,.

"Reply LS on RedCap UE MBS Broadcast reception", 3GPP TSG RAN WG2#124, R2-2311763, SA WG2, Nov. 13-17, 2023, 1 page.

"3rd Generation Partnership Project; Technical Specification Group Radio Access Network; NR; NR and NG-RAN Overall Description; Stage 2 (Release 17)", 3GPP TS 38.300, V17.6.0, Sep. 2023, pp. 1-211.

Non-Final Office action received for corresponding U.S. Appl. No. 18/912,722, dated Jan. 24, 2025, 7 pages.

International Search Report and Written Opinion received for corresponding Patent Cooperation Treaty Application No. PCT/ FI2024/050474, dated Jan. 27, 2025, 15 pages.

"Support for RedCap UEs in MBS Broadcast", 3GPP SA WG2 Meeting #159, S2-2311681, Qualcomm Incorporated, Oct. 9-13, 2023, pp. 1-11.

"3rd Generation Partnership Project; Technical Specification Group Services and System Aspects; Architectural enhancements for 5G multicast-broadcast services; Stage 2 (Release 18)", 3GPP TS 23.247, V18.3.0, Sep. 2023, pp. 1-134.

"FSAI for RedCap UE vs non-RedCap UE broadcast reception", 3GPP TSG-RAN WG2 Meeting #125, R2-2400906, Agenda: 7.24. 2, Nokia, Feb. 26-Mar. 1, 2024, 3 pages.

International Search Report and Written Opinion received for corresponding Patent Cooperation Treaty Application No. PCT/ FI2024/050475, dated Jan. 28, 2025, 18 pages.

Extended European Search Report received for corresponding European Patent Application No. 24198046.5, dated Feb. 11, 2025, 12 pages.

"RedCap CFR for MBS broadcast", 3GPP TSG-RAN2 Meeting #120-e, R2-2212271, Agenda: 6.1.3, Ericsson, Nov. 14-18, 2022, 5 pages.

"Support for RedCap UEs in MBS Broadcast", 3GPP SA WG2 Meeting #159, S2-2311338, Qualcomm Incorporated, Oct. 9-13, 2023, 13 pages.

"MBS service area and MCCH acquisition", 3GPP TSG-RAN2 Meeting #119bis-e, R2-2210712, Agenda: 6.1.2, Ericsson, Oct. 10-19, 2022, 3 pages.

"Discussion on Broadcast Service Continuity", 3GPP TSG-RAN WG2 Meeting #116 electronic, R2-2109998, Agenda: 8.1.3.1, vivo, Nov. 1-12, 2021, 5 pages.

Extended European Search Report received for corresponding European Patent Application No. 24199138.9, dated Feb. 14, 2025, 14 pages.

"Report from MBS breakout session", 3GPP TSG-RAN WG2 Meeting #123, R2-2308967, Huawei, Aug. 21-25, 2023, 12 pages.

"FSAI for MBS Redcap and non-Redcap", 3GPP TSG-RAN WG3#123, R3-240344, Agenda: 8.1, Nokia, Feb. 26-Mar. 1, 2024, pp. 1-3.

"MBS FSA ID for the RedCap UEs", 3GPP TSG-SA2 Meeting #162, S2-2404232, Nokia, Apr. 15-19, 2024, 13 pages.

U.S. Notice of Allowance corresponding to U.S. Appl. No. 18/912,722, dated Apr. 30, 2025, 7 pages.

Examiner's tentative rejection corresponding to Taiwanese Patent Application No. 113139540, dated May 20, 2025, 28 pages.

(56)         References Cited

OTHER PUBLICATIONS

Office action corresponding to Taiwanese Patent Application No.
113139565, dated Jul. 1, 2025, 18 pages.

* cited by examiner

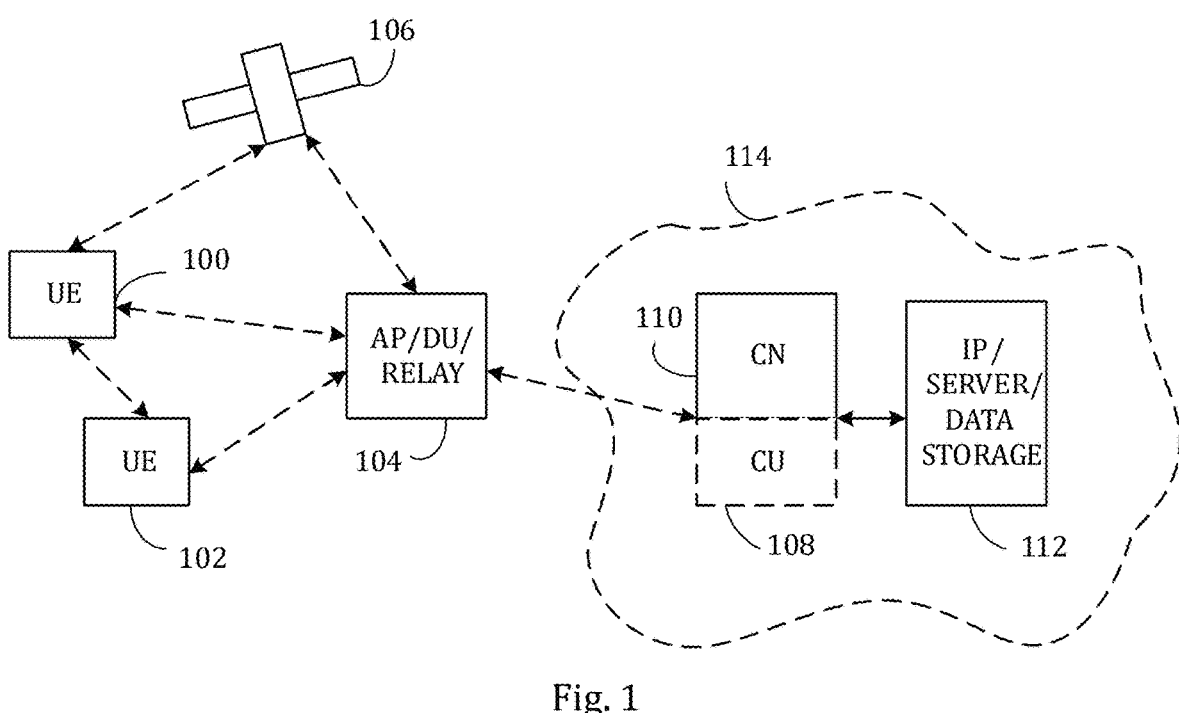

Fig. 1

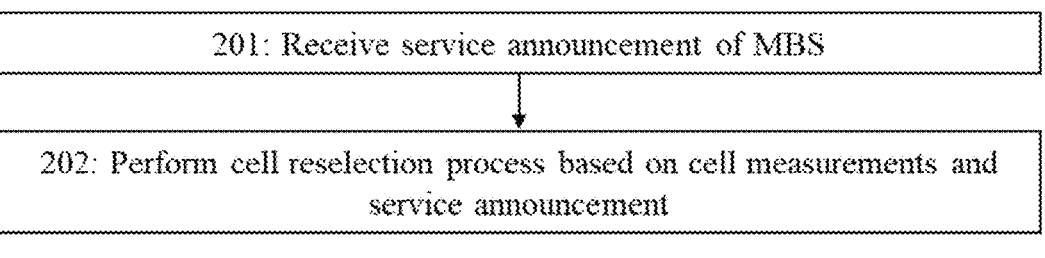

201: Receive service announcement of MBS

202: Perform cell reselection process based on cell measurements and service announcement

Fig. 2

301: Receive service announcement of MBS comprising at least one frequency indicated for being defined for RedCap terminal devices 302: Receive at least one FSAI-to-frequency mapping 303: Perform cell reselection process based on cell measurements, service announcement and at least one FSAI-to-frequency mapping

Fig. 3

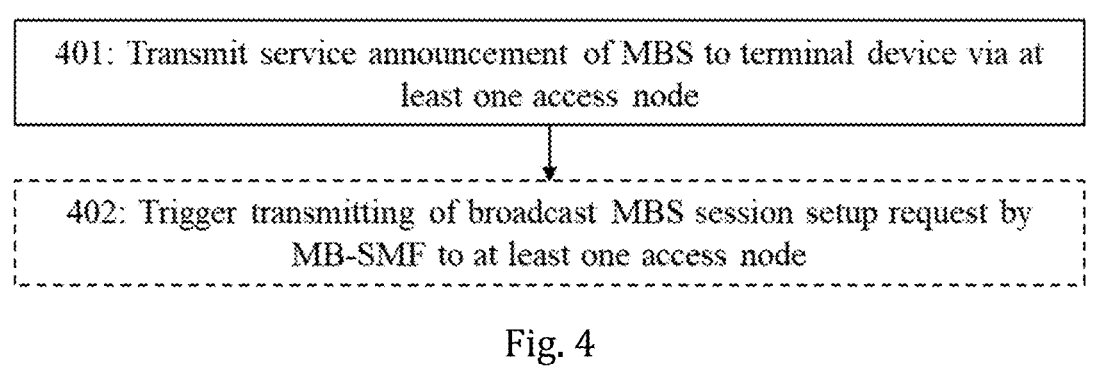

401: Transmit service announcement of MBS to terminal device via at least one access node 402: Trigger transmitting of broadcast MBS session setup request by MB-SMF to at least one access node

Fig. 4

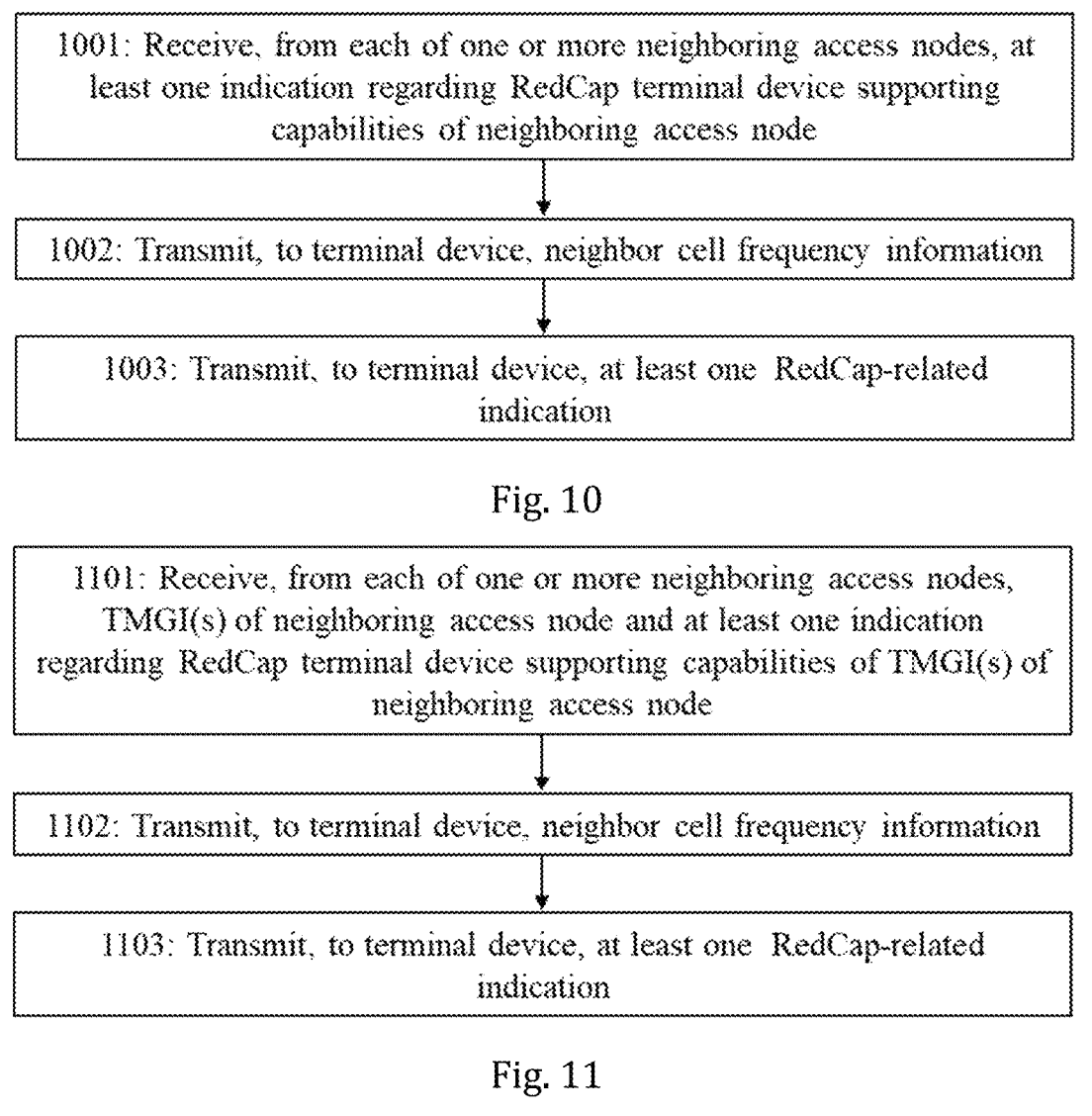

1001: Receive, from each of one or more neighboring access nodes, at least one indication regarding RedCap terminal device supporting capabilities of neighboring access node

↓

1002: Transmit, to terminal device, neighbor cell frequency information

↓

1003: Transmit, to terminal device, at least one RedCap-related indication

Fig. 10

1101: Receive, from each of one or more neighboring access nodes, TMGI(s) of neighboring access node and at least one indication regarding RedCap terminal device supporting capabilities of TMGI(s) of neighboring access node

↓

1102: Transmit, to terminal device, neighbor cell frequency information

↓

1103: Transmit, to terminal device, at least one RedCap-related indication

FREQUENCY PRIORITIZATION FOR TERMINAL DEVICES RECEIVING A MULTICAST BROADCAST SERVICE

TECHNICAL FIELD

Various example embodiments relate to wireless communications.

BACKGROUND

Reduced Capability (RedCap) terminal devices are terminal devices complying with certain pre-defined bandwidth (BW) limitations. In other words, RedCap terminal devices cannot employ for reception bandwidths larger than a pre-defined maximum bandwidth (e.g., 20 MHz). Correspondingly, RedCap-specific common frequency resources (CFRs) have been introduced for reception of a multicast broadcast service (MBS) by RedCap terminal devices. As a service area of a specific temporary mobile group identity (TMGI) may comprise both access nodes supporting and not supporting RedCap CFRs, same frequency selection guidance for cell reselection is not appropriate for both RedCap and non-RedCap terminal devices due to the fact that the RedCap terminal devices are able to receive the service in only some of the cells of the service area. Thus, a new mechanism is needed for guiding RedCap and non-RedCap terminal devices in a different manner in cell reselection decisions.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

BRIEF DESCRIPTION OF THE DRAWINGS

FIG. 1 illustrates a system to which some embodiments may be applied;

FIGS. 2 to 4 illustrate processes according to embodiments;

FIGS. 7 & 8 illustrate two alternative core network signalling scenarios between a multicast/broadcast session management function (MB-SMF), a network exposure function (NEF) and an application function (AF) according to embodiments for enabling performing of cell reselection;

FIGS. 9 to 11 illustrate processes according to embodiments;

DETAILED DESCRIPTION OF SOME EMBODIMENTS

Figure 5:
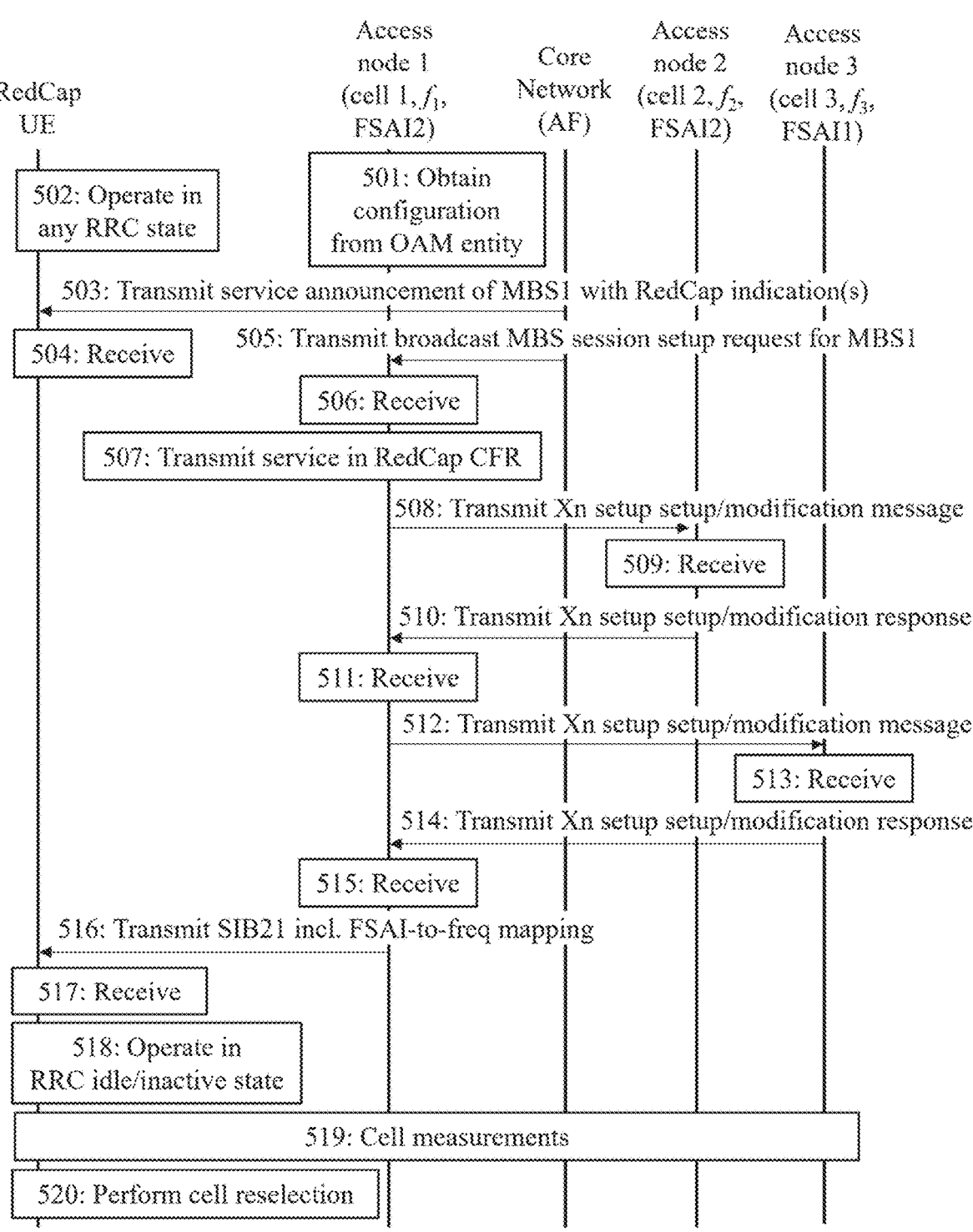
FIG. 5 illustrates a signalling scenario between a terminal device, three access nodes and a core network according to embodiments.

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, the equivalent terms "Reduced Capability terminal device", "RedCap terminal device", "Reduced Capability user equipment" and "RedCap UE" may be defined as follows. The 3rd generation partnership project (3GPP) has introduced the reduced capability (RedCap) devices in new radio (NR) Release 17 (Rel-17). RedCap devices may also be referred to as RedCap terminal devices, RedCap UEs, NR-Lite devices, or NR-Light devices, for example. The 3GPP RedCap NR feature reduces UE complexity through fewer receiver/transmitter (Rx/Tx) antennas, reduced UE use of bandwidth, lower UE power consumption, relaxed data rates, relaxed UE processing time and processing capability to help enable some exciting use cases, for example around industrial wireless sensors, video surveillance and wearables.

In NR, below 6GHz or 7GHz frequency range may be called as FR1, and above 24 GHz (or more exactly 24-52.6 GHZ) as FR2, respectively. Maximum bandwidth of an FR1 RedCap UE during and after initial access is 20 MHz. Maximum bandwidth of an FR2 RedCap UE during and after initial access is 100 MHz. For frequency bands where legacy NR UE is required to be equipped with a minimum of 2 reception (Rx) antenna ports or with minimum of 4 Rx antenna ports, the minimum number of Rx branches supported for a RedCap UE is 1. For a RedCap UE with 1 Rx branch, 1 downlink (DL) multiple input-multiple output (MIMO) layer is supported. For a RedCap UE with 2 Rx branches, 2 DL MIMO layers are supported.

RedCap devices may coexist with non-RedCap UEs (i.e., there may be both RedCap devices and non-RedCap UEs in a given cell).

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

In some embodiments, the core network 110 may comprise an application function (AF). The AF is a functional element that provides service-or application-related information to network function (NF) service consumers. The AF may be provide one or more services. The AF resides in the control plane of the 5G Service-Based Architecture (SBA). The responsibilities of the AF comprise, for example, accessing the network exposure function (NEF) for retrieving resources, interacting with the policy control function (PCF) for enabling policy control, performing traffic routing for applications and providing application services to subscribers.

In some embodiments, the core network 110 may comprise a network exposure function (NEF). The NEF may be configured to, for example, securely expose the services and capabilities provided by 3GPP network functions.

In some embodiments, the core network 110 may comprise multicast/broadcast session management function (MB-SMF). The MBS-SMF may be configured, for example, to manage multicast/broadcast service (MBS) sessions and interact with the RAN and multicast/broadcast user plane function (MB-UPF) for data transport. It should be noted that the term "multicast/broadcast" is equivalent with the alternative wordings "multicast-broadcast" or "multicast broadcast" which are all in use in the relevant technical field.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. The user equipment may comprise a mobile equipment and at least one universal integrated circuit card (UICC).

The user device typically refers to a portable computing device that includes wireless mobile communication devices operating with or without a subscriber identification module (SIM) or UICC, including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements con-trolling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHZ-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into the RAN by utilizing network function virtualization (NVF) and software defined networking (SDN). Using edge cloud may mean access node operations to be carried out, at least partly, in a server, host or node operationally coupled to a remote radio head or unit (RU) or base station comprising radio parts. It is also possible that node operations will be distributed among a plurality of servers, nodes or hosts. Application of cloud-RAN architecture enables RAN real time functions being carried out at the RAN side (in a distributed unit, DU 104) and non-real time functions being carried out in a centralized manner (in a central or centralized unit, CU 108). Thus, in summary, the RAN may comprise at least one distributed access node comprising a central unit, one or more distributed units communicatively connected to the central unit and one or more (remote) radio heads or units, each of which is communicatively connected to at least one of the one or more distributed units.

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR)

networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future rail-way/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto-or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

6G architecture is targeted to enable easy integration of everything, such as a network of networks, joint communication and sensing, non-terrestrial networks and terrestrial communication. 6G systems are envisioned to encompass machine learning algorithms as well as local and distributed computing capabilities, where virtualized network functions can be distributed over core and edge computing resources. Far edge computing, where computing resources are pushed to the very edge of the network, will be part of the distributed computing environment, for example in "zero-delay" scenarios. 5G systems may also employ such capabilities. More generally, the actual (radio) communication system is envisaged to be comprised of one or more computer programs executed within a programmable infrastructure, such as general-purpose computing entities (servers, processors, and like).

At least some of the embodiments to be discussed below relate specifically to broadcast as defined in 3rd Generation Partnership Project (3GPP) Release 17. Therein, the broadcast service is defined as an alternative to the multicast service. In broadcast service, one transmitter transmits service to all users (or UEs) in a broadcast service area. In multicast service, one or more transmitters transmit service to a dedicate set of users (or UEs). The broadcast service enables the reception by UEs in any radio resource control (RRC) state as long as the UE is within coverage. Usage of a specific service announcement related to the MBS broadcast service and public land mobile network (PLMN) is required in broadcast service, unlike in multicast service. Temporary Mobile Group Identity (TMGI) is supported as an identifier of the MBS broadcast session.

A UE in any RRC states may be able to receive a broadcast service. The configuration of the MBS broadcast service is provided via system information block 20 (SIB20)/multicast control channel (MCCH) that is periodically transmitted in each cell within the MBS service area. The MCCH and the broadcast data itself can be received by a UE in a frequency region called as Common Frequency Resources (CFRs).

For broadcast, a UE receives via service announcement of an MBS service (that can be transmitted via unicast or using another broadcast session) frequency selection area identity (FSAI) or identities (of a broadcast MBS session) applicable to that MBS service. In general, the (MBS) FSAI is used for broadcast MBS session to guide the frequency selection of the UE. The FSAI may be sometimes equally called the FSA identifier (FSA ID). Specifically, the (MBS) FSAI identifies a preconfigured area within, and in proximity to, which the cell(s) announces the MBS FSAI and the associating frequency. The same FSAI(s) may be applicable to multiple MBS services and/or to multiple broadcast MBS sessions.

RAN nodes (e.g., access nodes) may be configured with FSAIs. Configuration of the FSAIs may be performed via operations, administration and maintenance (OAM) entity, for example. RAN nodes may exchange this information with neighbor RAN nodes. This information may be exchanged over the Xn interface. Based on the configuration of FSAIs, RAN nodes may announce in SIBs over the radio interface information about the configured MBS FSAIs and operational frequencies of the RAN nodes. Namely, in system information block 21 (SIB21) of a cell, the UE is able to see a mapping of the FSAI to a neighbor cell frequency (i.e., a frequency used by a neighbor RAN node of a serving node of the UE). Then, the UE can prioritize a neighbor cell frequency in frequency selection based on the exchanged information. For example, a UE in RRC idle or inactive state may prioritize camping on the frequencies of the cells which provide specific broadcast sessions that the UE is interested in receiving. The UE may compare the MBS FSAI(s) included in the service announcement with the MBS FSAI(s) included in SIB(s) to perform the frequency selection. It should be noted that UE may, also or alternatively, receive the frequency that provides the service directly in a service announcement. In that case, the UE may directly prioritize the frequency indicated in the service announcement. Thus, the UE might not necessarily need the FSAI(s) or SIB21 for performing frequency selection.

When a broadcast MBS session is created, the AF may provide MBS FSAI(s) based on a (business) agreement. If the AF does not provide the MBS FSAI(s), the MB-SMF may determine the MBS FSAI(s) based on pre-configured mapping from MBS service area and/or broadcast MBS session information (e.g., application ID) to MBS FSAI(s) and send the determined MBS FSAI(s) to the AF (optionally via the NEF).

In some cases, during an MBS session start for broadcast and an MBS session update for broadcast, the MB-SMF may include the MBS FSAI(s) for the MBS session and send them to the RAN nodes via the application management function (AMF). The RAN nodes may then use those MBS FSAI(s) to determine cells and/or frequencies within the MBS service area to broadcast MBS session data.

In the following, the reduced capability UEs or terminal devices are discussed in further detail for providing context and background for the embodiments. Reduced capability (RedCap) terminal devices are terminal devices which have certain pre-defined bandwidth (BW) limitations. Namely, RedCap terminal devices cannot employ reception bandwidths larger than a pre-defined maximum bandwidth (e.g., 20 MHZ). If an initial bandwidth part (BWP) of the system is larger than such limitations, the RedCap terminal devices utilize an initial BWP separately configured, e.g. by system information block 1 (SIB1). A RedCap terminal device may be able to receive broadcast data if the CFR(s) for MBS are configured appropriately for a RedCap terminal device. Namely, the reception of broadcast data is possible as long as the CFR bandwidth is smaller than or equal to the supported bandwidth of the RedCap terminal device. A service (e.g., an MBS) may be delivered in a dedicated RedCap CFR. It is up to an access node (e.g., a gNB) which CFR should be utilized for a specific service, as there is no indication coming to the access node from the core network for a broadcast session to be received by non-RedCap/RedCap terminal devices.

As described above, a new RedCap MBS CFR different than the earlier broadcast MBS CFR has been introduced for reception of broadcast control and data. It is assumed that some services are to be transmitted in the RedCap CFR and how the gNB selects whether to utilize such a CFR is left to OAM configuration.

A non-RedCap terminal device is not expected to read RedCap CFRs, and RedCap terminal devices are unable to read non-RedCap CFRs due to capability limitations. Consequently, if a broadcast service is targeting both RedCap and non-RedCap terminal devices, the access nodes should transmit the same service in two different CFRs. For this reason, a separate SIB20 and MCCH is employed for RedCap terminal devices. In cases where there are one or more access nodes in the service area of a specific TMGI that do not utilize a separate RedCap CFR (e.g., due to the access node being not configured for said functionality or simply deciding to transmit the service only in the non-RedCap CFR due to, e.g., congestion), the same frequency selection guidance is not appropriate for both RedCap and non-RedCap terminal devices. Namely, if the same frequency selection guidance based on the separate RedCap CFR would be used, RedCap terminal devices would be able to receive the service in only some of the cells of the service area.

Consequently, there is a need for a new mechanism for guiding RedCap and non-RedCap terminal devices receiving a broadcast service (e.g., an MBS) differently in cell reselection decisions. The embodiments to be discussed below serve to provide such a mechanism.

FIG. 2 illustrates a process according to embodiments for performing an informed cell reselection decision. The illustrated processes of FIG. 2 may be performed by a terminal device (or a UE) or a part thereof. Here, the terminal device may be one of the UEs 100, 102 of FIG. 1. The terminal device may be a RedCap terminal device or a non-RedCap terminal device. In the following, the entity performing the process of FIG. 2 is called an apparatus for simplicity.

Referring to FIG. 2, the apparatus receives, in block 201, a service announcement of an MBS. The service announcement received in block 201 may correspond to a broadcast transmission. The service announcement may be transmitted (or broadcasted) by an access node (e.g., a gNB). The service announcement may be initiated by an AF.

The service announcement of block 201 comprises at least one of: 1) at least one FSAI and at least one indication indicating that the at least one FSAI is defined for RedCap terminal devices, or 2) at least one frequency and at least one indication indicating that the at least one frequency is defined for RedCap terminal devices. The at least one FSAI and/or the at least one frequency are associated with the MBS indicated in the service announcement. In other words, a new indication for at least one FSAI or at least one frequency (or both) is included in the service announcement for indicating that the at least one FSAI or frequency is specifically for guiding RedCap terminal devices to a neighbor cell frequency using which the MBS may be provided according to BWP limitations of RedCap UEs. Based on the at least one indication (of either type mentioned above), the receiving apparatus is able to distinguish between FSAIs/ frequencies optimized for RedCap and non-RedCap.

In some alternative embodiments, the at least one (new) indication discussed in the previous paragraph may be received in a message other than the service announcement.

In some embodiments, the service announcement of block 201 may further comprise at least one FSAI or at least one frequency without any indication indicating that the at least one FSAI or the at least one frequency would be defined for RedCap terminal devices. In other words, the at least one further FSAI or frequency may not be associated with any indications indicating that said at least one further FSAI/ frequency is defined for RedCap terminal devices. It should, however, be emphasized that even though the at least one further FSAI/frequency is not specifically adapted for use with RedCap terminal devices, in some cases, they may still be usable with at least some RedCap terminal devices.

In some embodiments, the service announcement may further comprise, for at least one of the at least one FSAI or the at least one frequency defined for RedCap terminal devices, information on at least one bandwidth limitation condition with which the at least one FSAI or at least one frequency indicated as defined for reduced capability terminal devices complies. The at least one bandwidth limitation condition may comprise, e.g., at least one condition specifying a limitation in terms of terminal device type (e.g., only UE type-1 supported) and/or at least one condition specifying a limitation in terms of bandwidth or bandwidth part (e.g., a 100 MHz bandwidth limitation). Here, it is assumed that the terminal device type is related to bandwidth(s) or frequency band(s) usable by a terminal device of the defined type. For example, each terminal device type is associated with at least one bandwidth or at least one frequency band. The terminal device may store, in a memory, information on a mapping between one or more terminal device types and a list of one or more associated bandwidths and/or frequency bands. The at least one FSAI and/or at least one frequency may be employed by the terminal device only if the terminal device satisfies or is compatible with the at least one bandwidth limitation condition.

The apparatus (e.g., the terminal device) may be in any RRC state when it receives the service announcement of the MBS in block 201. Following the reception of the service announcement of the MBS, the apparatus may transition to an RRC inactive or idle state and start to receive the MBS specified by the service announcement.

Subsequently, the apparatus performs, in block 202, a cell reselection process based on cell measurements and the service announcement. Specifically, the cell reselection process may employ, in addition to the cell measurements, said at least one FSAI and the associated at least one indication (option 1) or said at least one frequency and the associated at least one indication (option 2).

The cell measurements may be performed by the apparatus itself. The cell measurements may comprise measurements of signals transmitted by one or more access nodes. The cell measurements may comprise, for example, measurements of at least one of: reference signal received power (RSRP), reference signal receiver quality (RSRQ), signal-to-noise ratio (SNR) or signal-to-interference-plus-noise ratio (SINR). The cell measurements may comprise measurements involving one or more (radio) frequencies (used in one or more neighbor cells). The cell measurements may comprise any cell measurements performed in the RRC inactive or idle state as defined in 3GPP TS 38.306 and/or TS 38.304.

How the service announcement is employed in the cell reselection process depends on whether the apparatus is a RedCap terminal device (or a part thereof) or a non-RedCap terminal device (or a part thereof).

If the apparatus is a RedCap terminal device (or a part thereof), the performing of the cell reselection process based on the service announcement in block 202 may comprise: prioritizing, in the cell reselection process, frequencies associated with the at least one FSAI or the at least one frequency indicated as defined for RedCap terminal devices. The prioritized frequencies, here and in the following discussion relating to block 202, may refer specifically to neighbor cell frequencies (i.e., frequencies used in one or more neighbor cells of the terminal device). A neighbor cell frequency is an operational frequency of a neighbor cell of a serving cell of the apparatus. If the service announcement of block 201 comprised the aforementioned one or more FSAIs or frequencies not indicated as being defined for RedCap terminal devices, the apparatus may specifically prioritize, in the cell reselection process, the frequencies associated with the at least one FSAI or the at least one frequency indicated as being defined for RedCap terminal devices at least over frequencies associated with the one or more FSAIs or one or more frequencies which are not indicated as defined for RedCap terminal devices. Optionally, if the one or more FSAIs or frequencies for RedCap terminal devices are not usable in the current cell of the apparatus (e.g., due to SIB21 not containing a corresponding FSAI-to-neighbor-cell mapping), the apparatus may prioritize the one or more FSAI or frequencies not defined for RedCap terminal devices over the at least one FSAI or frequency defined RedCap terminal devices. The apparatus may still be able to receive the MBS in a non-RedCap CFR if the limitations of the apparatus allow it to receive the non-RedCap CFR.

If the apparatus is a non-RedCap terminal device (or a part thereof), the performing of the cell reselection process based on the service announcement in block 202 may comprise: avoiding or ignoring, in the cell reselection process, frequencies associated with the at least one FSAI or the at least one frequency indicated as defined for RedCap terminal devices.

If the apparatus is a non-RedCap terminal device (or a part thereof) and the service announcement of block 201 comprised also the aforementioned one or more FSAIs or frequencies not indicated as being defined for RedCap terminal devices, the performing of the cell reselection process based on the service announcement in block 202 may comprise: prioritizing, in the cell reselection process, frequencies associated with the one or more FSAIs or the one or more frequencies which are not indicated as being defined for RedCap terminal devices over frequencies associated with the at least one FSAI or the at least one frequency indicated as defined for RedCap terminal devices. Optionally, if the one or more FSAIs or frequencies for non-RedCap terminal devices are not usable in the current cell of the apparatus (e.g., due to SIB21 not containing a corresponding FSAI-to-neighbor-cell mapping), the apparatus may prioritize the at least one FSAI or frequency defined for RedCap terminal devices over the one or more FSAIs or frequencies defined non-RedCap terminal devices. This could be useful, e.g., in scenarios where a service is provided only in RedCap CFR (and normal terminal devices are guided to RedCap CFR).

If the apparatus is a RedCap terminal device and the service announcement of block 201 comprises the information on the at least one bandwidth limitation condition with which the at least one FSAI or at least one frequency indicated as defined for RedCap terminal devices complies, the apparatus may perform the following. First, the apparatus may determine, for the at least one frequency or the at least one FSAI associated with the at least one bandwidth limitation condition, whether the RedCap terminal device meets the at least one bandwidth limitation condition. Subsequently, the apparatus may prioritize, in the cell reselection process, frequencies associated with at least one FSAI or at least one frequency for which the RedCap terminal device meets the at least one bandwidth limitation condition.

In some more general embodiments, the apparatus may receive a service announcement of an MBS and, either in the service announcement or in at least one message following the service announcement (or in both), at least one indication indicating support of a neighbor cell for all or at least some RedCap terminal devices for the MBS (or an MBS session). Said at least some RedCap terminal devices may correspond, for example, RedCap terminal device satisfying at least one UE type or bandwidth limitation condition. Said at least one message following the service announcement may comprise, for example, at least one SIB21 message. Subsequently, the apparatus may perform a cell reselection process based on cell measurements and the at least one indication (and optionally also on the service announcement), similar to as described in block 201).

FIG. 3 illustrates a process according to embodiments for performing an informed cell reselection decision. The illustrated processes of FIG. 3 may be performed by a terminal device (or a UE) or a part thereof. Here, the terminal device may be one of the UEs 100, 102 of FIG. 1. The terminal device may be a RedCap terminal device or a non-RedCap terminal device. In the following, the entity performing the process of FIG. 3 is called an apparatus for simplicity.

The process of FIG. 3 corresponds to a large extent to the process of FIG. 2. Any of the features and definitions provided in connection with FIG. 2 apply, mutatis mutandis, for the process of FIG. 3.

Referring to FIG. 3, the apparatus receives, in block 301, a service announcement of an MBS. The service announcement received in block 301 may correspond to a broadcast transmission. The service announcement may be transmitted by an access node (e.g., a gNB). The service announcement may be initiated by an AF.

The service announcement of block 301 comprises at least: at least one frequency and at least one indication indicating that the at least one frequency is defined for RedCap terminal devices (i.e., the service announcement corresponds to the option 2 discussed in connection with block 201). The at least one frequency may comprise (or consist of) at least one neighbor cell frequencies of the apparatus (i.e., at least one frequency of a neighbor cell of the serving cell of the apparatus). The at least one frequency is associated with the MBS indicated in the service announcement. If the frequency associated with the MBS is already given in the service announcement, the UE may directly prioritize that frequency.

The service announcement may comprise at least one FSAI and at least one indication indicating that the at least one FSAI is defined for RedCap terminal device. The service announcement may comprise at least one frequency or at least one FSAI, and at least one indication indicating that the at least one frequency or the at least one FSAI is defined for RedCap terminal devices.

Following the reception of the service announcement of the MBS, the apparatus receives, in block 302, at least one FSAI-to-frequency mapping comprising the at least one frequency. Thus, based on the at least one FSAI-to-frequency mapping, the apparatus is able to determine at least one FSAI corresponding to the at least one frequency. The at least one FSAI-to-frequency mapping may be received from an access node. The at least one FSAI-to-frequency mapping may form a part of a broadcast transmission of the access node. The receiving in block 302 may comprise, for example, receiving a SIB21 broadcast comprising said at least one FSAI-to-frequency mapping comprising the at least one frequency. During the reception of the at least one FSAI-to-frequency mapping in block 302, the apparatus may be in any RRC state. The apparatus may transition to RRC inactive or idle state and start receiving the MBS specified in the service announcement.

Subsequently, the apparatus performs, in block 303, a cell reselection process based on cell measurements, the service announcement and the at least one FSAI-to-frequency mapping. Specifically, the cell reselection process may employ, in addition to the cell measurements and the at least one FSAI-to-frequency mapping, said at least one (neighbor cell) frequency and the associated at least one indication comprised in the service announcement. Apart from using also the at least one FSAI-to-frequency mapping for the execution of the cell reselection process, the performing of the cell selection process may be carried out as described in connection with block 202 of FIG. 2.

FIG. 4 illustrates a process according to embodiments for enabling performing of an informed cell reselection decision. The illustrated processes of FIG. 4 may be performed by an application function (AF) or a part thereof. Here, the AF may be comprised in a core network 110 of FIG. 1. Dashed lines are used in FIG. 4 for indicating optional features. In the following, the entity performing the process of FIG. 4 is called an apparatus for simplicity.

Referring to FIG. 4, the apparatus transmits, in block 401, a service announcement of an MBS to at least one terminal device via at least one access node (and optionally one or more core network nodes). Here, the service announcement comprises (similar to as described in connection with above embodiments) at least one FSAI and at least one indication indicating that the at least one FSAI is defined for RedCap terminal devices or at least one frequency defined for reduced capability terminal devices and at least one indication indicating that the at least one frequency is defined for RedCap terminal devices. The at least one frequency may comprise (or consist of) one or more neighbor cell frequencies of the apparatus. The service announcement may be defined as described in connection with above embodiments. The at least one access node may merely broadcast/transmit the service announcement without accessing its contents.

The apparatus causes or triggers, in block 402, transmission of a broadcast MBS session setup request by an MB-SMF to at least one access node. This causing or triggering may comprise transmitting, via the NEF to the MB-SMF, an MBS session creation (or create) request of an MBS session. The MBS session creation (or create) request may comprise the at least one FSAI and the at least one indication indicating that the at least one FSAI is defined for RedCap terminal devices. Upon receiving the MBS session creation request, the MB-SMF may use the at least one indication indicating the at least one FSAI for transmitting the broadcast MBS session setup request. This functionality described in further detail in connection with FIG. 7.

In some embodiments, block 402 may be omitted. Namely, in such embodiments, the transmission of the broadcast MBS session setup request may still be carried out but not triggered (directly) by the apparatus (e.g., the AF) but by the MB-SMF itself upon generating at least one FSAI for RedCap terminal devices. In these embodiments, the apparatus may still transmit an MBS session creation (or create) request of an MBS session though without including the at least one FSAI and the associated at least one indication indicating that the at least one FSAI is defined for RedCap terminal devices. This functionality described in further detail in connection with FIG. 8.

FIG. 5 illustrates signalling between a RedCap terminal device (called, in the following, just a terminal device for brevity), first, second and third access nodes and a core network. The first, second and third access nodes (being, e.g., gNBs) may serve cells 1, 2 and 3, respectively, using respective (carrier) frequencies $f_1$, $f_2$ and $f_3$ and respective FSAIs FSAI2, FSAI2 and FSAI1. Here, the FSAI2 may be an FSAI defined for RedCap terminal devices while the FSAI1 may be an FSAI not defined specifically for RedCap terminal devices. The terminal device may be operating in cell 1. The functionalities associated with the core network may be carried out by an application function (AF) of the core network in communication with a network exposure function (NEF) of the core network and a multicast/broadcast session management function (MB-SMF) of the core network. While FIG. 5 illustrates a communication scenario where the first access node providing the (initial) serving cell for the terminal device has two neighboring access nodes, the features and functionalities described below in connection with FIG. 5 may be applied equally also to a case where the first access node has a single neighboring access node or more than two neighboring access nodes.

Referring to FIG. 5, as an initial pre-configuration step, the access node obtains or receives, in block 501, configuration information from an OAM entity. The OAM entity (or entities) may be located in the core network. The configuration information comprises at least one indication indicating that at least one FSAI is defined for reduced capability terminal devices. Here, said at least one FSAI comprises at least the FSAI2. In other words, the OAM entity (or entities) configures the FSAI2 marked as for RedCap terminal device, in this example. In some embodiments, blocks 501 may be omitted (i.e., the associated feature may be considered optional).

In some embodiments, the configuration information of block 501 may further define a bandwidth for CFRs defined for reduced capability terminal devices.

In some embodiments, the configuration information of block 501 may optionally further comprise a mapping between FSAIs and (operational) frequencies of one or more neighboring cells (provided by the second and third access node).

The terminal device is assumed to be initially operating, in block 502, in any RRC state. During this operation, a core network entity (or node or function) of the core network transmits, in message 503, a service announcement of a particular MBS (called, in the following, MBS1) via the first access node to the terminal device and the terminal device receives, in block 504, the service announcement. Said core network node initiating the transmission may be the AF (though the service announcement may be transmitted also via one or more other core network nodes). In response to or based on receiving the service announcement, the first access node may simply forward the service announcement to the terminal device (or, more generally, to one or more terminal devices). The service announcement may be received in block 504 by the terminal device either in unicast when the terminal device is operating in an RRC connected state or as a broadcast transmission when the terminal device is operating in any RRC state.

The service announcement may be defined, in general, as described in connection with previous embodiments. Namely, the service announcement comprises, in this example scenario, two FSAIs: FSAI1 and FSAI2. Additionally, the service announcement comprises an indication that FSAI2 is for RedCap terminal devices (and thus usable for RedCap-based cell reselection). The service announcement may be associated with a particular TMGI (serving to identify the MBS session).

A core network entity (or node or function) transmits, in message 505, a broadcast MBS session setup request for a session of the MBS1 (called in the following MBS session 1) to the first access node. The broadcast MBS session setup request may be transmitted, for example, by the AF via zero or more other core network nodes to the access node. The broadcast MBS session setup request comprises at least one FSAI indicated, in the configuration information of block 501, as being defined for RedCap terminal devices and optionally one or more FSAIs which are not indicated as being defined for RedCap terminal devices. In this particular example, the broadcast MBS session setup request comprises at least the FSAI1 (not specifically for RedCap terminal devices) and the FSAI2 (for RedCap terminal devices). Optionally, the broadcast MBS session setup request may comprise also the indication that the FSAI2 is for RedCap terminal devices (i.e., suitable for RedCap-based cell reselection). The first access node receives, in block 506, the broadcast MBS session setup request for said MBS session 1.

In some embodiments, the service announcement received in block 504 by the terminal device and/or the broadcast MBS session setup request received in block 506 by the first access node comprise, for at least one of the at least one FSAI (e.g., for the FSAI2) or at least one frequency, information on at least one bandwidth limitation condition with which a FSAI or frequency defined for reduced capability terminal devices complies. In other words, the service announcement and/or the broadcast MBS session setup request may comprise the granularity relating, e.g., to UE type limitation (defining implicitly at least one bandwidth limitation) or bandwidth limitation of the MBS1 (e.g., a 100 MHz bandwidth limitation).

The first access node triggers or initiates, in block 507, transmission of the MBS session (i.e., the MBS session 1) within RedCap CFRs based on information obtained in blocks 501 and/or 506. Said information may comprise the at least one FSAI (in this example, the FSAI2) and the at least one indication indicating that said at least one FSAI is defined for RedCap terminal devices.

Following the triggering of the transmission of the MBS session in block 507, the first access node transmits one or more messages 508, 512 to one or more neighboring access nodes. Each of the one or more messages 508, 512 comprises the at least one FSAI (i.e., the FSAI2 in the illustrated example) and the at least one indication indicating that the at least one FSAI is defined for reduced capability terminal devices. In other words, the FSAI(s) signaled towards the neighbor access node(s) is complemented with a RedCap indication (i.e., indicating that the associated FSAI is for RedCap terminal devices). In the illustrated example, the one or more neighboring access nodes comprise the second and third access nodes. The contents of the one or more messages 508, 512 may be derived or generated based on a configuration of the first access node and/or the broadcast MBS session setup request 505.

The one or more messages 508, 512 may be or comprise specifically one or more Xn setup and/or modification messages. In other words, when a new Xn connection is made with another access node (Xn setup) or for an existing Xn connection (Xn modification), the first access nodes transmits, in Xn setup or modification messages 508, 512, the FSAI2 along with an implicit or explicit indication that it is currently in use (i.e., the first access node transmits broadcast setup and start of the transmission trigger FSAI information to neighbor access node). Notably, if the first access node did not start transmissions in RedCap CFRs, it would not have transmitted FSAI2 to any neighbor access nodes. Thus, any neighbor access node is able to determine that the RedCap CFR(s) are in use based on the received FSAI2.

In the example of FIG. 5, the second access node receives, in block 509, a message (being, e.g., an Xn setup or modification message) comprising the FSAI2 and an indication that the FSAI2 is currently in use from the first access node, and the third access node receives, in block 513, a message (being, e.g., an Xn setup or modification message) comprising the FSAI2 and an indication that the FSAI2 is currently in use from the first access node.

In some embodiments where the FSAI2 and the RedCap CFR(s) are in use also in the second access node such as the one illustrated in FIG. 5, the second access node may also transmit, in message 510, a message (being, e.g., an Xn setup or modification message) comprising the FSAI2 and an indication that the FSAI2 is currently in use by the second access node to the first access node. This message is received by the first access node in block 511. In other embodiments (namely, when the FSAI2 is currently not in use by the second access node), elements 510, 511 may be omitted.

In some embodiments where the FSAI1 and associated non-RedCap CFR(s) is in use in the third access node such as the one illustrated in FIG. 5, the third access node may also transmit, in message 514, a message (being, e.g., an Xn setup or modification message) comprising the FSAI1 and an indication that the FSAI1 is currently in use by the third access node to the first access node. This message is received by the first access node in block 515. In other embodiments (namely, when the FSAI1 is currently not in use by the third access node), elements 514, 515 may be omitted.

It should be noted that, in the case where elements 510, 511 and/or elements 514, 515 are included, a broadcast MBS session setup request may also be transmitted from the core network to the second and/or third access node (similar to as illustrated for the first access node in FIG. 5). These broadcast MBS session setup requests have been omitted from FIG. 5 merely for simplicity of presentation (namely, FIG. 5 seeks to primarily illustrate operation of the first access node, as opposed to illustrating fully the operation of the first, second and third access nodes).

In some alternative embodiments (not depicted in FIG. 5), the information exchange of elements 508 to 515 may occur before the transmission and reception of the broadcast MBS session setup request (elements 505, 506). The contents of the transmitted message 508/510/512/514 may be derived or generated based on a configuration of the transmitting access node.

In some embodiments, elements 508 to 515 may be omitted. For example, it may be assumed, in some embodiments, that the configuration of the FSAIs is (relatively) static and thus there is no need for communicating the FSAIs and associated RedCap indications after an initial configuration or after transmission of a broadcast MBS session setup request.

The first access node transmits, in message 516, at least a mapping between at least one FSAI defined for reduced capability terminal devices and at least one frequency (i.e., an FSAI-to-frequency mapping). The mapping may have been generated or formed by the first access node based on the messages received in block 511 and/or 515 (being, e.g., Xn setup or modification messages). The terminal device receives, in block 516, said mapping. The message 516 may be a SIB21. The transmission of message 516 may correspond to broadcasting. In general, the information transmitted in message 516 may comprise a mapping between any FSAIs received in block 511 and/or 515 and frequencies associated with those FSAIs. The same FSAI(s) may also be defined in the service announcement (though the first access node itself does not have access to the contents of the service announcement). In the specific example of FIG. 5, the transmitted information, being in the form of the SIB21, comprises a FSAI2-to-$f_2$ mapping and a FSAI1-to-$f_3$ mapping.

Following the reception of the mapping (e.g., the SIB21), the terminal device operates, in block 518, RRC idle or inactive state. Similar to as described in connection with previous embodiments, the terminal device carries out, in block 519, cell measurements with the first, second and third access nodes. Based on those cell measurements and the service announcement (and the mapping if the service announcement comprised no frequencies), the terminal device performs, in block 520, cell reselection. In the example of FIG. 5, the terminal device may consider $f_2$ as the highest priority for cell reselection as this frequency is specifically defined for RedCap terminal devices. Alternatively, the terminal device may consider $f_2$ as the highest priority for cell reselection only if FSAI2 complies with limitations of the terminal device, that is, the terminal device satisfies with the at least one bandwidth limitation condition defined in the service announcement. Examples of this cell reselection are discussed below in connection with FIG. 6A and 6B.

While in some embodiments the usage of RedCap/non-RedCap CFRs at access nodes may correspond to a (relatively) static configuration, in other embodiments, the usage of RedCap/non-RedCap CFRs may be more dynamically adjusted based on decisions of a given access node (i.e., it is not a static configuration). In this more dynamic embodiments, the indication of FSAI-to-frequency mapping, e.g., using in SIB21 (message 516) can be more dynamically adapted for enabling appropriate cell reselection at the terminal devices. For that purpose, in Xn signaling of configured FSAIs towards neighboring access nodes (elements 508 to 515), non-RedCap and/or RedCap FSAI(s) are only included in case a given MBS is currently being transmitted in the corresponding CFRs. In other words, the access nodes may not necessarily share all configured FSAIs in the Xn setup/modification messages transmitted to neighboring access nodes but only the ones which are associated with CFR(s) currently in use.

Figure 6A:
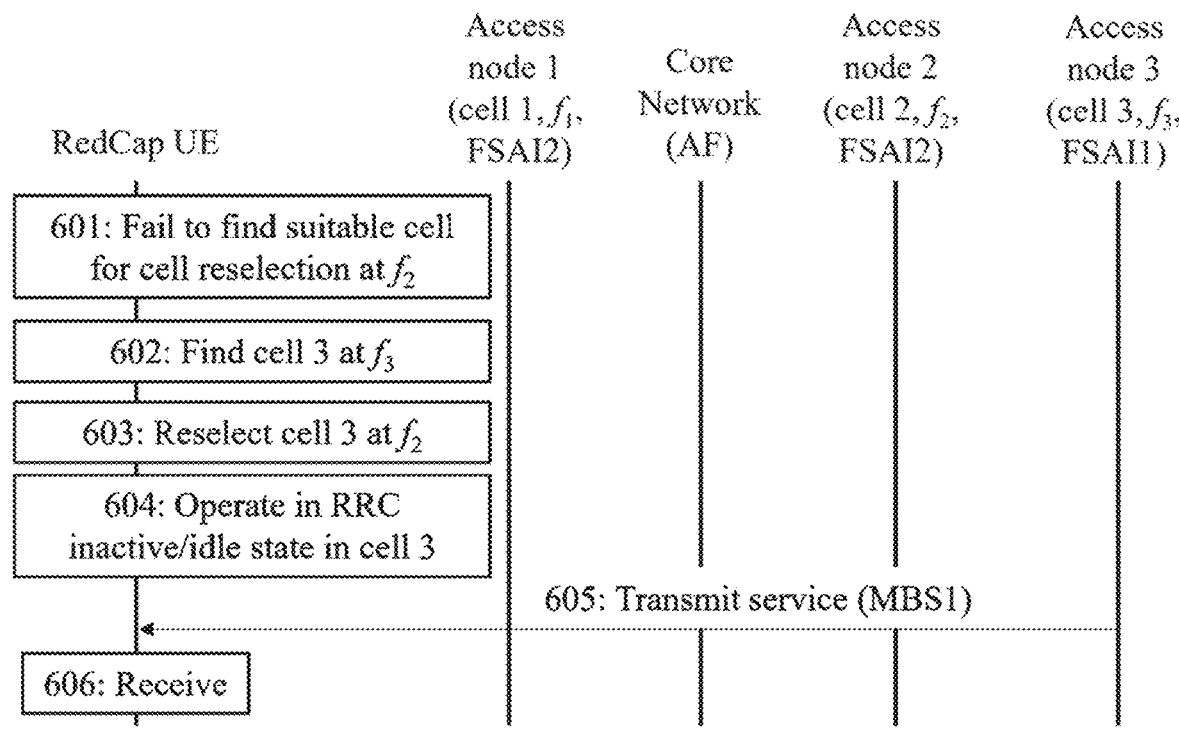
FIGS. 6A & 6B illustrate two exemplary signalling scenarios between a terminal device, three access nodes and a core network for performing cell reselection according to embodiments.
Figure 6B:
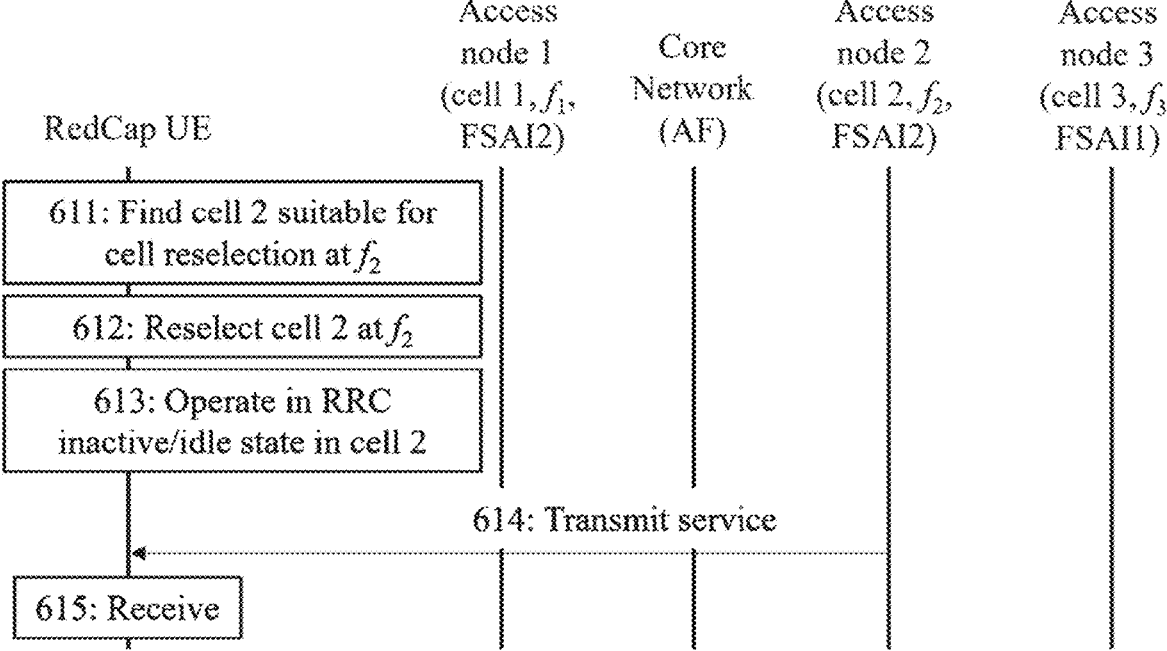

FIGS. 6A & 6B illustrate two alternative signalling scenarios for performing the cell reselection of block 520 of FIG. 5. Thus, the processes of FIGS. 6A & 6B may be carried out following the completion of the processes of elements 501 to 519 of FIG. 5. The RedCap terminal device (called in the following just a terminal device), the first, second and third access nodes and the core network of FIGS. 6A & 6B may be defined as described in connection with FIG. 5.

Referring to FIG. 6A, the terminal device prioritizes the frequency $f_2$ defined for RedCap terminal devices in the cell reselection (i.e., in searching for cells to be selected), as described also in connection with FIG. 5. Accordingly, the terminal device initially tries and fails, in block 601, to find a suitable cell for cell reselection using the frequency $f_2$ based on results of cell measurements. Next, the terminal device tries finding a suitable cell at the frequency $f_3$ not defined specifically for RedCap terminal devices. Namely, the terminal device knows that the MBS1/MBS session 1 is to be provided using the frequency $f_3$, in addition to the preferred but unavailable frequency $f_2$. The terminal device finds, in block 602, cell 3 which uses the frequency $f_3$ and reselects, in block 603, the cell 3. In other words, the terminal device transitions from the current cell 1 to a new cell 3. The terminal device operates, in block 604, in the RRC inactive or idle state in cell 3. In other words, the terminal device starts camping on cell 3. Finally, the third access node transmits, in message 605, the MBS1/MBS session 1 via cell 3 to the terminal device. The terminal device receives, in block 606, the MBS1/MBS session 1. In this example, it is assumed that the non-RedCap CFRs of message 605 are such that they are compatible with the RedCap terminal device and its bandwidth limitations and thus the reception of the MBS1/MBS session 1 via cell 3 is successful. If this is not the case, the MBS1/MBS session 1 cannot be received successfully.

Referring to FIG. 6B, the terminal device prioritizes the frequency $f_2$ defined for RedCap terminal devices in the cell reselection (i.e., in searching for cells to be selected), as described also in connection with FIGS. 5 & 6A. Accordingly, the terminal device initially tries, in block 611, to find a suitable cell for cell reselection using the frequency $f_2$ based on results of cell measurements. In this example, the terminal device is assumed to be successful in finding, in block 611, cell 2 which is suitable for the cell reselection using the frequency $f_2$. The terminal device reselects, in block 612, the cell 2. In other words, the terminal device transitions from the current cell 1 to a new cell 2. The terminal device operates, in block 613, in the RRC inactive or idle state in cell 2. In other words, the terminal device starts camping on cell 2. Finally, the second access node transmits, in message 614, the MBS1/MBS session 1 via cell 2 to the terminal device. The terminal device receives, in block 615, the MBS1/MBS session 1. As the frequency $f_2$ is specifically defined for RedCap terminal devices, no compatibility can arise due to the terminal device being a RedCap terminal device (in contrast to the example of FIG. 6A).

Figure 7:
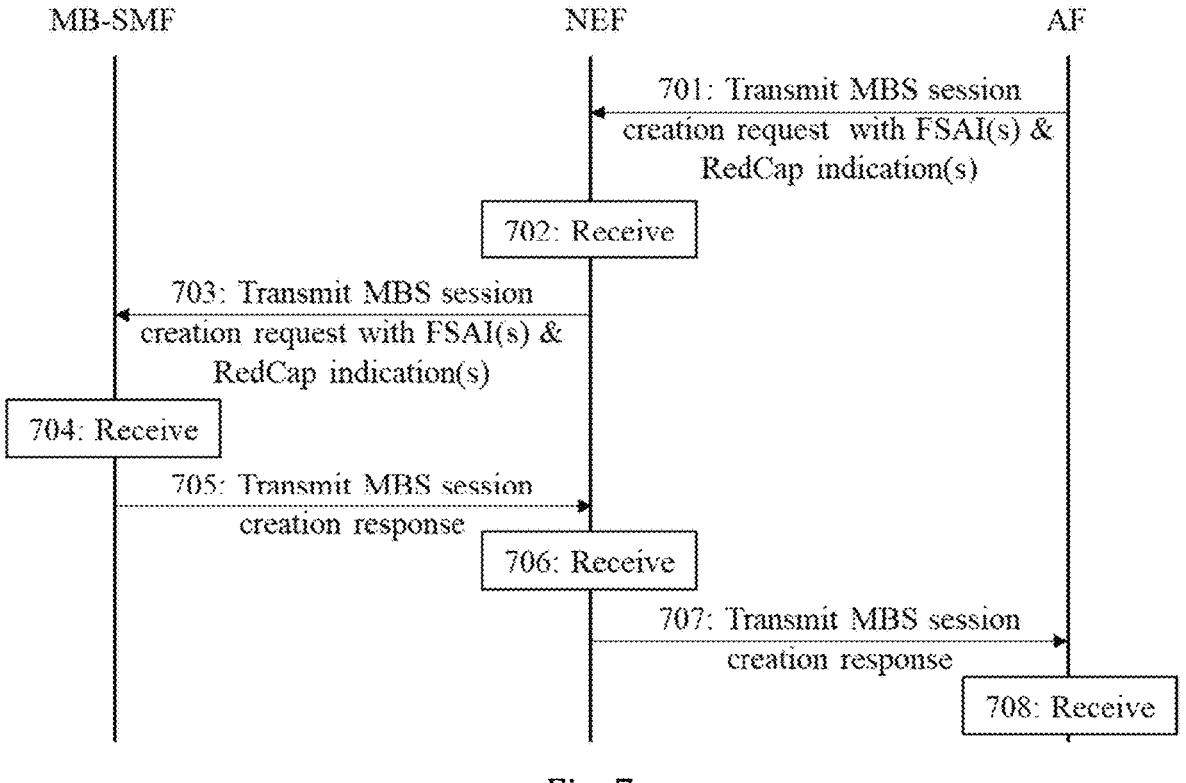
Figures 8, 9:
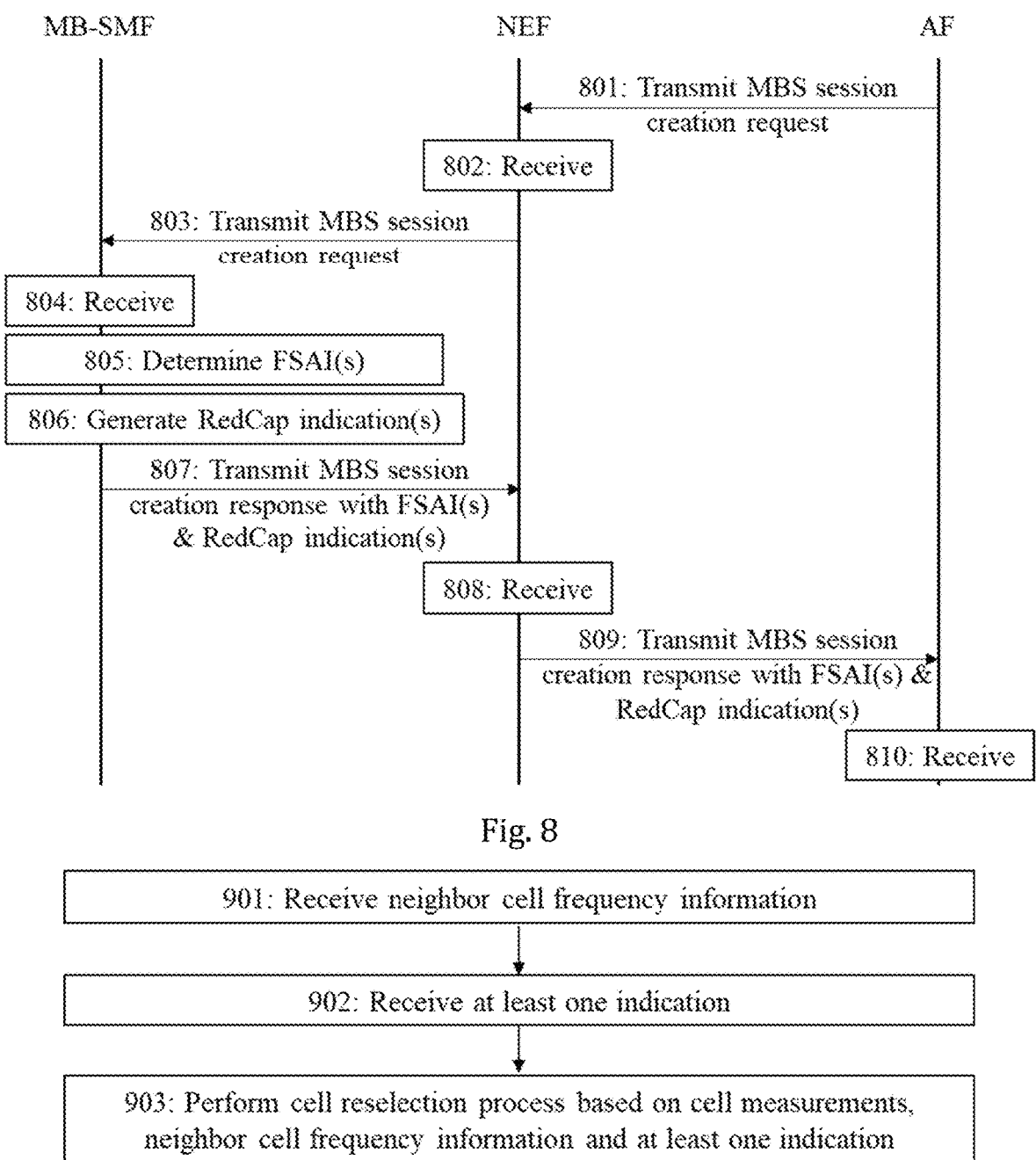

FIGS. 7 & 8 illustrate two alternative core network signalling scenarios between an MB-SMF, an NEF and an AF of a core network according to embodiments for enabling performing of cell reselection. Namely, FIGS. 7 & 8 illustrate processes for creating an indication for an FSAI targeting RedCap-specific cell reselection. These processes also enable or cause transmission of an MBS session setup request from the AF to at least one access node, as discussed in connection with previous embodiments. The processes of FIGS. 7 & 8 may be carried out before execution of any of the processes discussed in connection with FIGS. 2 to 5, 6A and 6B. The AF of FIGS. 7 & 8 may be assumed to provide at least one MBS.

In the signaling scenario of FIG. 7, the AF is configured to provide FSAIs for the MBS (or MBS sessions). It is assumed in FIG. 7 that the AF is aware (e.g., based on a pre-defined agreement) of a particular MBS which is targeting RedCap terminal devices (and optionally also non-RedCap terminal devices). In other words, the AF is aware of the UE type targeted by said MBS.

The AF transmits, in elements 701 to 703, an MBS session creation request to the MB-SMF via the NEF for enabling the transmission of the MBS session setup request to the at least one access node. Specifically, the AF transmits, in message 701, a first MBS session creation request to the NEF. Here, the first MBS session creation request comprises at least one FSAI and at least one indication indicating that the at least one FSAI is defined for RedCap terminal devices. Optionally, the first MBS session creation request may comprise also one or more FSAIs which are not specifically for RedCap terminal device (i.e., which are not accompanied with an indication indicating that they would be defined for RedCap terminal devices). The NEF receives, in block 702, the first MBS session creation request and transmits, in message 703, a second MBS session creation request to the NEF. The contents described above for the first MBS session creation request apply also for the second MBS session creation request (that is, the NEF may effectively forward the contents of the first MBS session creation request to the MB-SMF). Thus, the second MBS session creation request also comprises the at least one FSAI and the at least one (RedCap-related) indication and optionally the one or more FSAIs not accompanied with such an indication. The first MBS session creation request (message 701) may be an Nnef_MBS_NBSSession_Create_Request message. The second MBS session creation request (message 703) may be an Nmbsmf_MMBSSession_Create_Request message.

In some embodiments, the first and second MBS session creation requests may also comprise, for at least one of the at least one FSAI which are defined for RedCap terminal devices, information on at least one bandwidth limitation condition with which a FSAI (or frequency) defined for RedCap terminal devices complies. In other words, the first and second MBS session creation requests may comprise the granularity relating, e.g., to UE type limitation (defining implicitly at least one bandwidth limitation) or bandwidth limitation of the MBS1 session (e.g., a 100 MHz bandwidth limitation).

The MB-SMF receives, in block 704, the second MBS session creation request from the NEF. Subsequently, the MB-SMF may employ the at least one indication in further interactions towards one or more access nodes (not shown in FIG. 7). Namely, the MB-SMF may subsequently transmit a broadcast MBS session setup request for the said MBS, where the broadcast MBS session setup request comprises the at least one FSAI and the at least one indication indicating that the at least one FSAI is defined for RedCap terminal devices.

Following the reception in block 704, the MB-SMF transmits, in message 705, a first MBS session creation response back to the NEF. Upon receiving the first MBS session creation response in block 706, the NEF transmits, in message 707, a second MBS session creation response to the AF. The AF receives, in block 708, the second MBS session creation response. The first and second MBS session creation response merely serve to acknowledge the successful reception of the second MBS session creation request at the MB-SMF. The first MBS session creation response (message 705) may be an Nmbsmf_MMBSSession_Create_Response message. The second MBS session creation response (message 707) may be an Nnef_MBSSession_Create_Response message.

In some embodiments, elements 705 to 708 may be omitted.

As mentioned above, FIG. 8 illustrates an alternative core network signalling scenario to the core network signalling of FIG. 7. The fundamental difference between the two solutions is that, in the signaling scenario of FIG. 8, the AF is not configured to provide FSAIs for the MBS (or MBS sessions) like in FIG. 7. Instead, the FSAIs are created by the MB-SMF.

Referring to FIG. 8, the AF transmits, in elements 801 to 803, an MBS session creation request to the MB-SMF via the NEF for enabling the transmission of the MBS session setup request to the at least one access node, similar to FIG. 7. However, here, no FSAIs or associated RedCap indications are included in the MBS session creation request(s) as the AF is no knowledge of the FSAIs or the associated RedCap indications. Thus, more specifically, the AF transmits, in message 801, a first MBS session creation request to the NEF. The NEF receives, in block 802, the first MBS session creation request and transmits, in message 803, a second MBS session creation request to the NEF. Neither of the first and second MBS session creation requests may contain any FSAIs or associated indications relating to the MBS session to be created. The first MBS session creation request (message 801) may be an Nnef_MBS_NBSSession_Create_Request message. The second MBS session creation request (message 803) may be an Nmbsmf_MMBSSession_Create_Request message.

The MB-SMF receives, in block 804, the second MBS session creation request from the NEF. Subsequently, the MB-SMF generates (or creates or determines), in block 805, at least one FSAI for RedCap terminal devices and optionally one or more FSAIs not defined (specifically) for RedCap terminal device. The generating (or creating or determining) may be based on pre-configured information or based on some other indication received from the AF and indicating that the service is targeting RedCap/non-RedCap terminal devices. The pre-configured information may comprise a pre-defined mapping which may be, e.g., a mapping between an MBS service area and FSAI(s). Alternatively, the pre-defined mapping may be a mapping between broadcast MBS session information (e.g., an application identifier, ID) and FSAI(s) or a mapping between a combination of an MBS service area and broadcast MBS session information (e.g., an application identifier, ID) and FSAI(s). Moreover, the MB-SMF creates or generates, in block 806, at least one indication indicating that said at least one FSAI (determined in block 805) is defined for RedCap terminal devices.

The MB-SMF transmits, in message 807, a first MBS session creation response back to the NEF. Here, the first MBS session creation request comprises the at least one FSAI for RedCap terminal devices (and optionally one or more non-RedCap-specific FSAIs) created in block 805 and the at least one (RedCap) indication created in block 806. Upon receiving the first MBS session creation response in block 808, the NEF transmits, in message 809, a second MBS session creation response to the AF. The second MBS session creation response also comprises the at least one FSAI for RedCap terminal devices (and optionally one or more non-RedCap-specific FSAIs) created in block 805 and the at least one (RedCap) indication created in block 806. The AF receives, in block 810, the second MBS session creation response. The AF may store contents of the second MBS session creation response to a memory. Thus, the first and second MBS session creation responses serve here not only to acknowledge the successful reception of the second MBS session creation request at the MB-SMF but also to communicate the generated FSAI(s) and indication(s) back to the AF. The first MBS session creation response (message 807) may be an Nmbsmf_MMBSSession_Create_Response message. The second MBS session creation response (message 809) may be an Nnef_MBSSession_Create_Response message.

In some embodiments, elements 807 to 810 may be omitted.

It should be noted that while FIGS. 7 & 8 illustrate session creation without Policy Control Check (PCC), similar decisions may be made and similar procedures may be applied also during session creation with PCC. If PCC is employed, some of the signaling interactions between the AF and the MB-SMF discussed in connection with FIG. 7 and/or 8 may be subject to further checks and the specific names of the messages may be different though the basic principle of operation remains unchanged.

The embodiments described above were based on introducing a new indication for FSAI (or a frequency) in the service announcement of an MBS for indicating that particular FSAI/frequency is for guiding RedCap terminal devices to a neighbor cell frequency where the MBS is to be provided according to limitations of RedCap terminal devices. Thus, in said embodiments, RedCap-specific guidance was driven and implemented primarily by the core network. In other embodiments, this may not be the case. Namely, in some other embodiments, the RedCap-specific guidance may be driven and implemented primarily by the RAN. In such embodiments, the RedCap-specific additional information may be omitted from the service announcement (i.e., the service announcement is not enhanced) and corresponding information may be determined and communicated to the terminal device, instead, by the serving access node. In these embodiments, the service announcement may still provide information on FSAIs of neighboring access nodes in general though the RedCap-supporting FSAIs are not specifically indicated therein.

FIG. 9 illustrates a process according to embodiments for performing an informed cell reselection decision. The illustrated processes of FIG. 9 may be performed by a terminal device (or a UE) or a part thereof. Here, the terminal device may be one of the UEs 100, 102 of FIG. 1. The terminal device may be a RedCap terminal device or a non-RedCap terminal device. In the following, the entity performing the process of FIG. 9 is called an apparatus for simplicity.

Referring to FIG. 9, the illustrated functionalities may be carried out following a reception of a service announcement for an MBS session. This service announcement may have defined one or more FSAIs for the MBS session but it may not have included any of the RedCap terminal device specific information discussed in connection with previous embodiments (e.g., in connection with block 201 of FIG. 2). Consequently, the apparatus is still in need of such information for being able to perform cell reselection in an optimal manner. The apparatus may operate in an RRC inactive or idle state at the start of the process of FIG. 9 (and during blocks 901, 902).

The apparatus receives, in block 901, neighbor cell frequency information. The neighbor cell frequency information comprises a mapping between at least one neighbor cell frequency of at least one neighbor cell and at least one FSAI for at least one MBS session. Here and in the following, neighbor cell frequency is an operational frequency of a neighbor cell of a serving cell of the apparatus. The neighbor cell frequency information may relate to one or more neighboring access nodes. The neighbor cell frequency information may be received from an access node. The neighbor cell frequency information may be received as (a part of) a broadcast transmission.

The apparatus receives, in block 902, at least one indication. Each indication may be associated with a single neighbor cell or multiple neighbor cells (the at least one indications, thus, providing together information on one or multiple different neighbor cells). Each indication provides information on RedCap supporting capabilities associated with the at least one FSAI or the at least one MBS session or at least information usable for determining said RedCap supporting capabilities. Namely, each of the at least one indication indicates at least one of:

whether RedCap terminal devices are supported for the at least one FSAI or the at least one MBS session,
  at least one type of RedCap terminal device supported for the at least one FSAI or the at least one MBS session, or
  at least one size of CFRs usable for the at least one FSAI or the at least one MBS session.

Each type of information listed above with bullet points may be indicated per neighbor cell (i.e., the information may be neighbor cell specific).

Type of RedCap terminal device may be associated with bandwidth size or frequency band supported by RedCap terminal device. For example, type 1 device may be a RedCap terminal device supporting a bandwidth size 1, and type 2 device may be a RedCap terminal device supporting a bandwidth size 2. In some embodiments, the indication indicating the at least one type of RedCap terminal device may get a null value (or other pre-defined value) if no type of RedCap terminal device is supported for the at least one FSAI or the at least one MBS session.

In some embodiments, the at least one type of RedCap terminal device supporting the CFRs is associated with at least one (maximum) bandwidth size supported by RedCap terminal devices.

It should be noted that the at least one size of CFRs (or equally CFR bandwidth) may be employed by the apparatus for determining whether RedCap terminal devices in general or RedCap terminal devices of a particular type RedCap are supported by comparing a supported bandwidth of a RedCap terminal device (of a certain type) to the at least one size of CFRs. Thus, all of the indication types listed above enable the apparatus to take into account the RedCap terminal device support capability of the neighbor cells when performing cell reselection.

The at least one indication in block 902 may be associated with (and provide information on) at least one neighbor cell. Each of the at least one indication in block 902 may be associated with a different neighbor cell (or a different set of one or more neighbor cells). Thus, a given indication defined for a neighbor cell may indicate at least one of: whether reduced capability terminal devices are supported for the at least one FSAI or the at least one MBS session at said neighbor cell, at least one type of RedCap terminal device supported for the at least one FSAI or the at least one MBS session at said neighbor cell or at least one size of CFRs usable for the at least one FSAI or the at least one MBS session at said neighbor cell.

The at least one indication of block 902 may be received from an access node (e.g., from the access node which transmitted the neighbor cell frequency information). The at least one indication of block 902 may be received as a broadcast transmission or as a part of a broadcast transmission.

In some embodiments, the information received in blocks 901, 902 may form (different) parts of a single message. Said single message may be, e.g., a SIB21 message. Said SIB21 message may further comprise a mapping between the at least one FSAI defined for RedCap terminal devices according to a previous service announcement and at least one frequency.

In some embodiments, the information received in blocks 901, 902 (e.g., in the form of a SIB21 message) corresponds to information on at least one neighbor cell frequency and, for each of said at least one neighbor cell frequency, one or more data sets. Said at least one neighbor cell frequency may relate to one or more different neighbor cells provided by a single neighbor access node or one or more different neighbor access nodes. Each data set associated with a given neighbor cell frequency comprises an FSAI for an MBS session and said at least one indication of block 902 describing, explicitly or implicitly, support for RedCap terminal devices.

The apparatus performs, in block 903, a cell reselection process based on cell measurements and the neighbor cell frequency information and the at least one indication.

The cell measurements of block 903 may be performed by the apparatus itself. The cell measurements may comprise measurements of signals transmitted by one or more access nodes providing neighboring cells (that is, neighboring relative to the current serving cell of the apparatus). The cell measurements may comprise, for example, measurements of at least one of: reference signal received power (RSRP), reference signal receiver quality (RSRQ), signal-to-noise ratio (SNR) or signal-to-interference-plus-noise ratio (SINR). The cell measurements may comprise measurements involving one or more (radio) frequencies (used in one or more neighbor cells). The cell measurements may comprise any cell measurements performed in the RRC inactive or idle state as defined in 3GPP TS 38.306and/or TS 38.304.

In some embodiments, the apparatus is a RedCap terminal device and the at least one indication of block 902 indicates that RedCap terminal devices are supported for the at least one FSAI without indicating either of the at least one size of the CFR used for the at least one FSAI and the least one type of RedCap terminal device supported for the at least one FSAI (i.e., only the basic information regarding RedCap support is provided). In such embodiments, the apparatus may prioritize, in the cell reselection process of block 903, any neighbor cell frequencies associated with the at least one indication indicating that reduced capability terminal devices are supported for the at least one FSAI or the at least one MBS session. In other words, any neighbor cell frequencies associated with the at least one FSAI or the at least one MBS session indicated as supporting RedCap terminal devices may be prioritized. Alternatively, the apparatus may prioritize, in the cell reselection process of block 903, any neighbor cell frequencies associated with the at least one indication indicating that reduced capability terminal devices are supported for the at least one FSAI or the at least one MBS session only if the BWP limitations (or other limitations) of the terminal device allow the terminal device to receive the MBS in the associated neighbor cell.

In some embodiments, the apparatus is a RedCap terminal device and the at least one indication of block 902 indicates the at least one size of the CFRs used for the at least one FSAI or the at least one MBS session. In such embodiments, the apparatus may prioritize, in the cell reselection process of block 903, at least one neighbor cell frequency (or any neighbor cell frequencies) associated with a size of CFRs supported by the RedCap terminal device (i.e., the apparatus).

In some embodiments, the apparatus is a RedCap terminal device and the at least one indication of block 902 indicates the at least one type of reduced capability terminal device supported for the at least one FSAI or the at least one MBS session. In such embodiments, the apparatus may prioritize, in the cell reselection process of block 903, at least one neighbor cell frequency (or any neighbor cell frequencies) associated with a type of RedCap terminal device corresponding to the RedCap terminal device (i.e., the apparatus).

In some embodiments, both of the prioritization functionalities discussed in the two previous paragraphs may be implemented.

In some embodiments, the apparatus is a non-RedCap terminal device (i.e., a terminal device which is not defined as a RedCap terminal device). In such embodiments, the apparatus may prioritize, in the cell reselection process of block 903, at least one neighbor cell frequency (or any neighbor cell frequency) which fails to support RedCap terminal devices. This way any neighbor cell frequencies defined for RedCap terminal devices remain available for RedCap terminal devices (for which the choice of neighbor cell frequencies is more limited than for non-RedCap terminal devices). Whether or not a given neighbor cell frequency supports RedCap terminal device may be determined based on the at least one indication and the neighbor cell frequency information. Additionally or alternatively, the apparatus (being a non-RedCap terminal device) may avoid or ignore, in the cell reselection process of block 903, any neighbor cell frequency which supports RedCap terminal devices.

FIG. 10 illustrates a process according to embodiments for enabling performing of an informed cell reselection decision. The illustrated processes of FIG. 10 may be performed by an access node or a part thereof. The access node may be, for example, an access node 104 of FIG. 1. In the following, the entity performing the process of FIG. 4 is called an apparatus for simplicity.

Referring to FIG. 10, the apparatus receives, in block 1001, from at least one neighboring access node, at least one indication. The at least one indication serves to provide information on RedCap terminal device supporting capabilities of the at least one neighboring access node. Namely, the at least one indication indicates at least one of:

whether reduced capability terminal devices are supported for at least one FSAI or at least one MBS session at a neighboring access node among the at least one neighboring access node, at least one type of RedCap terminal device supported for at least one FSAI or at least one MBS session at the neighboring access node (or in a neighbor cell provided by the neighboring access node), at least one size of CFRs used for at least one FSAI or at least one MBS session at the neighboring access node, or at least one type of the CFRs being currently in use by the neighboring access node for at least one FSAI or at least one MBS session.

Here, the neighboring access node may be defined as an access node neighboring the apparatus (and thus providing one or more cells which neighbor one or more cells provided by the apparatus). Said at least one type of RedCap terminal device supported for the at least one FSAI or the at least one MBS session at the neighboring access node may be have been determined based on available CFRs in the associated neighbor cell.

The at least one indication in block 1001 may be associated with (and provide information on) at least one neighbor access node. The apparatus may receive, in block 1001, an indication from each of the at least one neighboring access node. Accordingly, each of the at least one indication in block 1002 may be associated with a different neighbor access node. Each indication may be associated with (i.e., provide information on) one or more neighbor cells provided by a neighbor access node.

In some embodiments, the at least one indication of block 1001 may be comprised in an Xn setup or modification message or response.

The apparatus transmits, in block 1002, to a terminal device, neighbor cell frequency information comprising a mapping between at least one neighbor cell frequency and at least one FSAI for at least one MBS session. Here, a neighbor cell frequency is an operational frequency of a neighbor cell of a serving cell provided by the apparatus. In general, the neighbor cell frequency information transmitted in block 1002 may be defined as described above in connection with the corresponding receiving step of block 901 of FIG. 9. The transmission of block 1002 may correspond to a broadcast transmission.

The apparatus transmits, in block 1003, to the terminal device, at least one indication. At least one indication indicates, per at least one neighbor cell provided by the at least one neighboring access node, at least one of:

whether reduced capability terminal devices are supported for the at least one FSAI or the at least one MBS session, at least one type of reduced capability terminal device supported for the at least one FSAI or the at least one MBS session, or at least one size of CFRs usable for the at least one FSAI or the at least one MBS session.

The apparatus may derive or generate the at least one indication of block 1003 based on the at least one indication of block 1001. In general, the at least one indication transmitted in block 1003 may be defined as described above in connection with the corresponding receiving step of block 902 of FIG. 9. The transmission of block 1003 may correspond to a broadcast transmission.

In some embodiments, the information transmitted (or broadcasted) in blocks 1002, 1003 may be contained in a single message. Said single message may be, for example, a SIB21 message.

FIG. 11 illustrates another process according to embodiments for enabling performing of an informed cell reselection decision. The illustrated processes of FIG. 11 may be performed by an access node or a part thereof. The access node may be, for example, an access node 104 of FIG. 1. In the following, the entity performing the process of FIG. 4 is called an apparatus for simplicity The apparatus receives, in block 1101, from each of one or more neighboring access nodes, at least one TMGI associated with at least one MBS session ongoing at a neighboring access node and, for each of the at least one TMGI, at least one indication relating to RedCap terminal device supporting capabilities of TMGI(s) of a given neighboring access node. The at least one indication indicates at least one of:

whether RedCap terminal devices are supported for a TMGI at the neighboring access node, at least one type of RedCap terminal device supported for the TMGI at the neighboring access node, or at least one size of CFRs used for the TMGI at the neighboring access node.

The apparatus transmits, in block 1102, to a terminal device, neighbor cell frequency information comprising a mapping between at least one neighbor cell frequency and at least one FSAI for the at least one MBS session. Here, a neighbor cell frequency is an operational frequency of a neighbor cell of a serving cell provided by the apparatus. The neighbor cell frequency information may be derived or generated based on the at least one TMGI, the at least one indication and a mapping between the at least one TMGI for the at least one MBS session and the at least one FSAI.

The apparatus transmits, in block 1103, to the terminal device, at least one indication. The at least one indication indicates, per neighbor cell (or per at least one neighbor cell), at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFRs, usable for the at least one FSAI or the at least one MBS session.

In some embodiments, the information transmitted (or broadcasted) in blocks 1102, 1103 may be contained in a single message. Said single message may be, for example, a SIB21 message.

Figure 12:
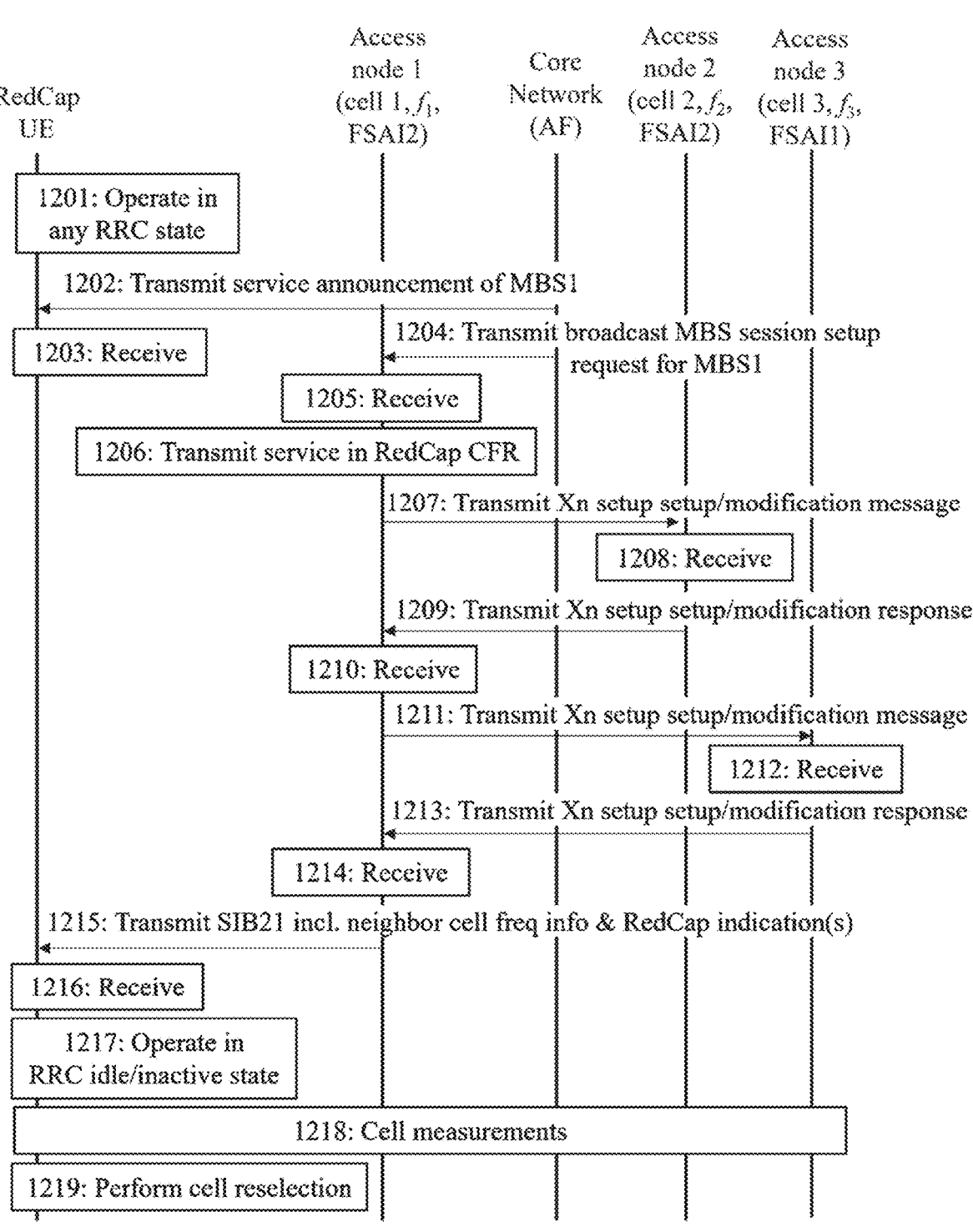
FIG. 12 illustrates a signalling scenario between a terminal device, three access nodes and a core network according to embodiments.

FIG. 12 illustrates signalling between a RedCap terminal device (called, in the following, just a terminal device for brevity), first, second and third access nodes and a core network. The first, second and third access nodes (being, e.g., gNBs) may serve cells 1, 2 and 3, respectively, using respective (carrier) frequencies f1, f2 and f3 and respective FSAIs FSAI2, FSAI2 and FSAI1. Here, the FSAI2 may be an FSAI defined for RedCap terminal devices while the FSAI1 may be an FSAI not defined specifically for RedCap terminal devices. The terminal device may be operating in cell 1. The functionalities associated with the core network may be carried out by an application function (AF) of the core network in communication with a network exposure function (NEF) of the core network and a multicast/broadcast session management function (MB-SMF) of the core network. While FIG. 12 illustrates a communication scenario where the first access node providing the (initial) serving cell for the terminal device has two neighboring access nodes, the features and functionalities described below in connection with FIG. 12 may be applied equally also to a case where the first access node has a single neighboring access node or more than two neighboring access nodes Referring to FIG. 12, the terminal device is assumed to be initially operating, in block 1201, in any RRC state. During this operation, a core network entity (or node or function) of the core network transmits, in message 1202, a service announcement of a particular MBS (called, in the following, MBS1) via the first access node to the terminal device and the terminal device receives, in block 1203, the service announcement. Said core network node initiating the transmission may be the AF (though the service announcement may be transmitted also via one or more other core network nodes). In response to or based on receiving the service announcement, the first access node may simply forward the service announcement to the terminal device (or, more generally, to one or more terminal devices). The service announcement may be received in block 1203 by the terminal device either in unicast when the terminal device is operating in an RRC connected state or as a broadcast transmission when the terminal device is operating in any RRC state.

The service announcement comprises, in this example scenario, two FSAIs: FSAI1 and FSAI2. In contrast of FIG. 5, the service announcement does not comprise any indication that FSAI2 is for RedCap terminal devices. In other words, the service announcement may be a "conventional" service announcement without additional functionalities. The service announcement may be associated with a particular TMGI (serving to identify the MBS session).

A core network entity (or node or function) transmits, in message 1204, a broadcast MBS session setup request for a session of the MBS1 (called in the following MBS session 1) to the first access node. The broadcast MBS session setup request may be transmitted, for example, by the AF via zero or more other core network nodes to the access node. The broadcast MBS session setup request comprises one or more FSAIs. In this particular example, the broadcast MBS session setup request comprises at least the FSAI1 and the FSAI2. In this embodiment (in contrast to, e.g., the embodiment of FIG. 5), the RedCap terminal device supporting capabilities of the one or more FSAI (e.g., FSAI1 & FSAI2) are unknown at this point. The first access node receives, in block 1205, the broadcast MBS session setup request for said MBS session 1.

The first access node triggers or initiates, in block 1206, transmission of the MBS session (i.e., the MBS session 1) within RedCap CFRs. Said transmission may be triggered or initiated based on an OAM configuration.

Following the triggering of the transmission of the MBS session in block 1206, the first access node transmits one or more messages 1207, 1211 to one or more neighboring access nodes (in this example, two messages 1207, 1211 to two neighboring access nodes, respectively). Each of the one or more messages 1207, 1211 comprises the at least one FSAI (i.e., the FSAI2 in the illustrated example) and the at least one indication indicating that the at least one FSAI is defined for reduced capability terminal devices. In other words, the FSAI(s) signalled towards the neighbor access node(s) is complemented with a RedCap indication (i.e., indicating that the associated FSAI is for RedCap terminal devices). In the illustrated example, the one or more neighboring access nodes comprise the second and third access nodes. The contents of the one or more messages 1207, 1211 may be derived or generated based on a configuration of the first access node and the broadcast MBS session setup request 1204.

The one or more messages 1207, 1211 may be or comprise specifically one or more Xn setup and/or modification messages. In other words, when a new Xn connection is made with another access node (Xn setup) or for an existing Xn connections (Xn modification), the first access nodes transmits, in the Xn setup or modification message 1207, the FSAI2 along with an implicit or explicit indication that it is currently in use (i.e., the first access node transmits broadcast setup and start of the transmission trigger FSAI information to neighbor access node). Notably, if the first access node did not start transmissions in RedCap CFRs, it would not have transmitted FSAI2 to any neighbor access nodes. Thus, any neighbor access node is able to determine that the RedCap CFR(s) are in use based on the received FSAI2.

In this embodiment, the one or more messages 1207, 1211 may comprise any information described in connection with block 1001 of FIG. 10 and/or 1101 of FIG. 11. As, in this example, the first access node is currently using RedCap CFRs with FSAI2 and MBS session 1, each of the one or more messages 1207, 1211 may comprise at least one indication indicating at least one of:

RedCap terminal devices are supported for FSAI2 or MBS session 1 at the first access node, at least one type of RedCap terminal device supported for FSAI2 or MBS session 1 at the first access node (or in a neighbor cell provided by the first access node), at least one size of CFRs used for FSAI2 or MBS session 1 at the first access node, at least one type of the CFRs being currently in use by the first access node for FSAI 2 or MBS session 1.

In some embodiments, the type of CFRs in use may possess further granularity, e.g., it may indicate (implicitly or explicitly) compliance with UE type limitations or compliance with a pre-defined bandwidth limitation (e.g., a 100 MHz bandwidth limitation). Each UE type may be assumed to be associated with one or more bandwidths or frequency bands supported by the UE. In other words, the one or more messages 1207, 1211 may comprise bandwidth limitation conditions as discussed in connection with above embodiments.

The second access node receives, in block 1208, the message (being, e.g., an Xn setup or modification message) comprising the FSAI2 and the at least one indication from the first access node. Similarly, the third access node receives, in block 1212, the message (being, e.g., an Xn setup or modification message) comprising the FSAI2 and the at least one indication from the first access node. The second and third access nodes transmit, in respective messages 1209, 1213, response messages (being, e.g., an Xn setup or modification messages) back to the first access node. The response message 1209, 1213 are received, in blocks 1210, 1214, by the first access node.

In the example of FIG. 12, the second access node is assumed to be currently using RedCap CFRs while the third access node is currently using non-RedCap CFR. Accordingly, the response message 1209 (being, e.g., an Xn setup or modification message) may comprise, similar to messages 1207, 1211, at least one indication indicating at least one of:

RedCap terminal devices are supported for FSAI2 or MBS session 1 at the second access node, at least one type of RedCap terminal device supported for FSAI2 or MBS session 1 at the second access node (or in a neighbor cell provided by the first access node), at least one size of CFRs used for FSAI2 or MBS session 1 at the second access node,.

at least one type of the CFRs being currently in use by the second access node for FSAI2 or MBS session 1.

As, in this example, the third access node is currently using non-RedCap CFRs with FSAI1 and MBS session 2, the response message 1213 (being, e.g., an Xn setup or modification message) may comprise at least one indication indicating at least one of:

RedCap terminal devices are not supported for FSAI1 or MBS session 2 at the first access node (that is, only non RedCap terminal devices are supported for FSAI1 or MBS session 2 at the first access node), no type of RedCap terminal device is supported for FSAI1 or MBS session 2 at the third access node, at least one size of CFRs used for FSAI1 or MBS session 2 at the third access node, at least one type of the CFRs being currently in use by the third access node for FSAI1 or MBS session 2.

In some embodiments, the information listed in the previous paragraph may be omitted from the message 1213. The message 1213 may be a conventional Xn setup or modification message. In these embodiments, the third access node may be an access node as defined in 3GPP Release 17 (with no additional functionalities).

In some embodiments, the one or more messages 1209, 1213 may comprise also bandwidth limitation conditions as discussed in connection with above embodiments.

Based on the information received in message(s) 1209 and/or 1213, the first access node transmits, in message 1215, a SIB21 message for cell reselection to at least one terminal device via at least one access node. Here, the SIB21 message comprises neighbor cell frequency information relating to cells provided by the second and third access node and at least one indication indicating (implicitly or explicitly) possible RedCap terminal device support associated with the FSAIs or MBS sessions of the second and third access nodes. The at least one terminal device comprises at least the RedCap terminal device illustrated in FIG. 12. The transmission of message 1215 may correspond to broadcasting. The transmission (or broadcasting) may be carried out regularly or periodically. In general, the transmission of the SIB21 message 1215 may correspond to a combination of blocks 1002, 1003 of FIG. 10 as discussed above. The neighbor cell frequency information and the at least one indication may defined as described in connection with FIG. 10.

The (RedCap) terminal device receives, in block 1216, the SIB21 message. Following the reception of the SIB21 message, the terminal device operates, in block 1217, RRC idle or inactive state receiving the broadcast MBS session (MBS session 1) from cell 1 of the first access node. Similar to as described in connection with previous embodiments, the terminal device carries out, in block 1218, cell measurements with the first, second and third access nodes. Based on those cell measurements and the SIB21 message (and optionally also the service announcement), the terminal device performs, in block 1219, cell reselection. In the example of FIG. 12 similar to the example of FIG. 5, the terminal device may consider $f_2$ as the highest priority for cell reselection as this frequency is specifically defined for RedCap terminal devices. Alternatively, the terminal device may consider $f_2$ as the highest priority for cell reselection only if FSAI2 complies with limitations of the terminal device, that is, the terminal device satisfies with the at least one bandwidth limitation conditions defined in the message(s) 1209 and/or 1213.

The examples of the cell reselection discussed above in connection with FIGS. 6A and 6B may apply, mutatis mutandis, also here (i.e., in connection with block 1219 of FIG. 12). In other words, either of the processes of FIGS. 6A and 6B may be carried out following the completion of elements 1201 to 1218 of FIG. 12.

In some simplistic embodiments, an access node is configured via OAM with information that certain FSAI(s) are associated with RedCap terminal devices (i.e., they support RedCap terminal devices) and optional with a suitable bandwidth. Based on this configuration, when receiving signaling to start an MBS session including any of those certain FSAIs, the access node transmits the service (i.e., the MBS) in the RedCap CFR and with a bandwidth suitable for RedCap UEs, possibly in addition to a transmission in a non-RedCap CFR.

The embodiments discussed above provide at least some of the following technical advantages. The embodiments allow different cell reselection prioritization to be performed by RedCap and non-RedCap terminal devices, which in turn leads proper (i.e., correct or appropriate) broadcast reception by the terminal devices in RRC inactive or idle state. The embodiments enable an access node to make an informed decisions regarding which CFR(s) to utilize for different broadcast services.

The blocks, related functions, and information exchanges described above by means of FIGS. 2 to 5, 6A, 6B and 7 to 12 are in no absolute chronological order, and some of them may be performed simultaneously or in an order differing from the given one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Figure 13:
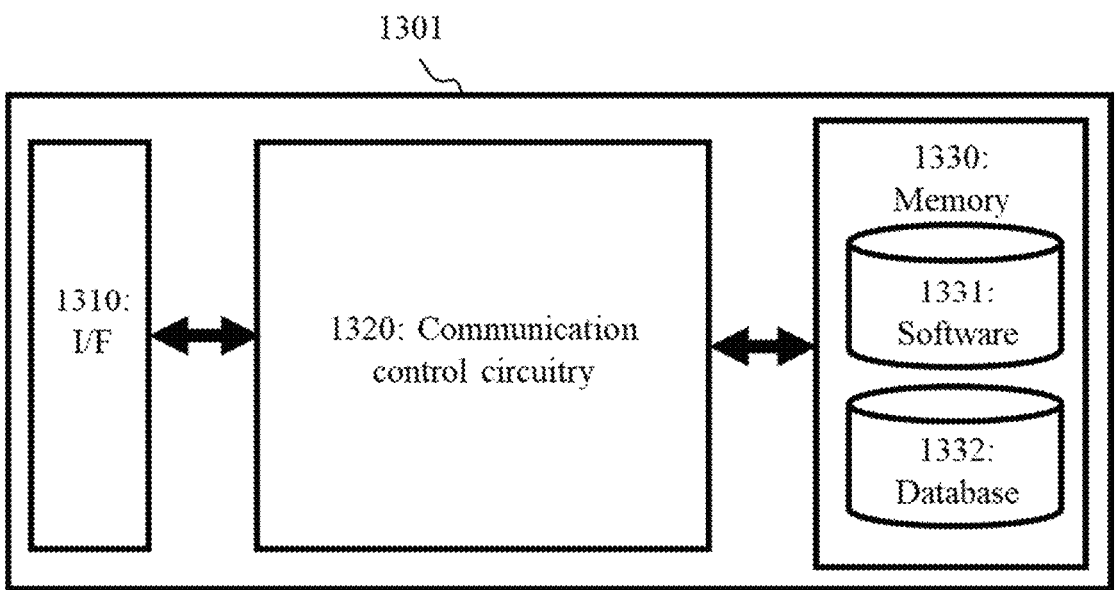
FIG. 13 illustrates an apparatus according to some embodiments.

FIG. 13 provides an apparatus 1301 according to some embodiments. Specifically, FIG. 13 may illustrate an apparatus 1301 being a terminal device, an access node or a core network node (e.g., an AF, an NEF or an MB-SMF). Alternatively, FIG. 13 may illustrate an apparatus 1301 being a part of a terminal device, an access node or a core network node (e.g., an AF, an NEF or an MB-SMF).

The apparatus 1301 may comprise one or more communication control circuitry 1320, such as at least one processor, and at least one memory 1340, including one or more algorithms 1331 (instructions), such as a computer program code (software) wherein the at least one memory 1340 and the computer program code (software) are configured, with the at least one processor, to cause the apparatus 1301 to carry out any one of the exemplified functionalities of the apparatus (being, e.g., the terminal device, the access node, the AF, the NEF or the MB-SMF) described above. Said at least one memory 1340 may also comprise at least one database 1332.

When the one or more communication control circuitry 1320 comprises more than one processor, the apparatus 1301 may be a distributed device wherein processing of tasks takes place in more than one physical unit. Each of the at least one processor may comprise one or more processor cores. A processing core may comprise, for example, a Cortex-A8 processing core manufactured by ARM Holdings or a Zen processing core designed by Advanced Micro Devices Corporation. The one or more communication control circuitry 1320 may comprise at least one Qualcomm Snapdragon and/or Intel Atom processor. The one or more communication control circuitry 1320 may comprise at least one application-specific integrated circuit (ASIC). The one or more control circuitry 1320 may comprise at least one field-programmable gate array (FPGA).

Referring to FIG. 13, the one or more communication control circuitry 1320 of the apparatus 1301 are configured to carry out functionalities described above by means of any of FIGS. 2 to 5, 6A, 6B and 7 to 12 using one or more individual circuitries. Specifically in the case of FIGS. 5, 6A, 6B, 7, 8 & 12, the one or more communication control circuitry 1320 of the apparatus 1301 are configured to carry out functionalities of at least one of the illustrated apparatuses. It is also feasible to use specific integrated circuits, such as ASIC (Application Specific Integrated Circuit) or other components and devices for implementing the functionalities in accordance with different embodiments.

Referring to FIG. 13, the apparatus 1301 may further comprise different interfaces 1310 such as one or more communication interfaces comprising hardware and/or software for realizing communication connectivity according to one or more communication protocols. Specifically when the apparatus 1301 is a terminal device or a part thereof, the one or more communication interfaces 1310 may comprise, for example, communication interfaces providing a connection between the apparatus 1301 and one or more access nodes for providing connection to core network (comprising, e.g., the MB-SMF, the NEF & the AF). If the apparatus 1301 is an access node or a part thereof, the one or more communication interfaces 1310 may comprise, for example, communication interfaces between the apparatus 1301 and one or more terminal device and between the apparatus 1301 and one or more core network nodes (comprising, e.g., the MB-SMF, the NEF & the AF). The one or more communication interfaces 1310 may comprise standard well-known components such as an amplifier, filter, frequency-converter, (de) modulator, and encoder/decoder circuitries, controlled by the corresponding controlling units, and one or more antennas. The apparatus 1301 may also comprise one or more user interfaces.

Referring to FIG. 13, the memory 1340 may be implemented using any suitable data storage technology, such as semiconductor based memory devices, flash memory, magnetic memory devices and systems, optical memory devices and systems, fixed memory and removable memory.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with soft-ware/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hard-ware circuit or processor (or multiple processors) or a portion of a hardware circuit or processor and its (or their) accompanying software and/or firmware.

In an embodiment, at least some of the processes described in connection with FIGS. 2 to 5, 6A, 6B and 7 to 12 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, filter (low-pass, high-pass, bandpass and/or bandstop), sensor, circuitry, inverter, capacitor, inductor, resistor, operational amplifier, diode and transistor. In an embodiment, the at least one processor, the memory, and the computer program code form processing means or comprises one or more computer program code portions for carrying out one or more operations according to any one of the embodiments of FIGS. 2 to 5, 6A, 6B and 7 to 12 or operations thereof. In some embodiments, at least some of the processes may be implemented using discrete components.

According to an embodiment, there is provided an apparatus (e.g., a terminal device or a UE or a part thereof) comprising means for performing:

receiving a service announcement of a multicast broadcast service, MBS, wherein the service announcement comprises:

at least one frequency selection area identity, FSAI and at least one indication indicating that the at least one FSAI is defined for reduced capability terminal devices, or at least one frequency and at least one indication indicating that the at least one frequency is defined for reduced capability terminal devices;

wherein the means are further configured to perform a cell reselection process based on cell measurements and the service announcement.

According to an embodiment, there is provided an apparatus (e.g., an AF or a part thereof) comprising means for performing:

receiving a service announcement of a multicast broadcast service, MBS, wherein the service announcement comprises:

at least one frequency selection area identity, FSAI and at least one indication indicating that the at least one FSAI is defined for reduced capability terminal devices, or at least one frequency and at least one indication indicating that the at least one frequency is defined for reduced capability terminal devices;

wherein the means are further configured to perform a cell reselection process based on cell measurements and the service announcement.

According to an embodiment, there is provided an apparatus (e.g., an access node or a part thereof) comprising means for performing receiving a broadcast multicast broadcast service, MBS, session setup request of an MBS session from a core network function, wherein the broadcast MBS session setup request comprises at least one frequency selection area identity, FSAI, and at least one indication indicating that the at least one FSAI is defined for reduced capability terminal devices; or receiving a broadcast MBS session setup request of the MBS session from the core network and configuration information from an operations, administration and management, OAM, entity, wherein the broadcast MBS session setup request comprises at least one FSAI and the configuration information comprises at least one indication indicating that the at least one FSAI is defined for reduced capability terminal devices; and wherein the means are further configured to perform:

triggering transmission of the MBS session within reduced capability common frequency resources, CFRs, based on the at least one FSAI and the at least one indication.

According to an embodiment, there is provided an apparatus (e.g., an MB-SMF or a part thereof) comprising means for performing:

receiving a multicast broadcast service, MBS, session creation request of an MBS session;

in response to or based on the receiving, generating, for the MBS session, at least one frequency selection area identity, FSAI, defined for reduced capability terminal devices and at least one indication indicating that the at least one FSAI is defined for reduced capability terminal devices; and transmitting a broadcast MBS session setup request of the MBS session to at least one access node, wherein the broadcast MBS session setup request comprises the at least one FSAI and the at least one indication.

According to an embodiment, there is provided an apparatus (e.g., a terminal device a part thereof) comprising means for performing:

receiving neighbor cell frequency information comprising a mapping between at least one neighbor cell frequency and at least one frequency selection area identity, FSAI, for at least one multicast broadcast service, MBS, session, wherein a neighbor cell frequency is an operational frequency of a neighbor cell of a serving cell of the apparatus;

receiving at least one indication indicating, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFR, usable for the at least one FSAI or the at least one MBS session; and performing a cell reselection process based on cell measurements and the neighbor cell frequency information and the at least one indication.

According to an embodiment, there is provided an apparatus (e.g., an access node or a part thereof) comprising means for performing:

receiving, from at least one neighboring access node, at least one indication indicating at least one of:

whether reduced capability terminal devices are supported for at least one frequency selection area identity, FSAI, or at least one multicast broadcast service, MBS, session at a neighboring access node among the at least one neighboring access node, at least one type of reduced capability terminal device supported for at least one FSAI or at least one MBS session at the neighboring access node, at least one size of common frequency resources, CFRs, used for at least one FSAI or at least one MBS session at the neighboring access node, at least one type of the CFRs being currently in use by the neighboring access node for at least one FSAI or at least one MBS session;

transmitting, to a terminal device, neighbor cell frequency information comprising a mapping between at least one neighbor cell frequency and at least one FSAI for at least one MBS session, wherein a neighbor cell frequency is an operational frequency of a neighbor cell of a serving cell provided by the apparatus; and transmitting, to the terminal device, at least one indication indicating, per at least one neighbor cell provided by the at least one neighboring access node, at least one of:

whether reduced capability terminal devices are supported for the at least one FSAI or the at least one MBS session, at least one type of reduced capability terminal device supported for the at least one FSAI or the at least one MBS session, or at least one size of CFRs usable for the at least one FSAI or the at least one MBS session.

According to an embodiment, there is provided an apparatus (e.g., an access node or a part thereof) comprising means for performing:

receiving, from each of one or more neighboring access nodes, at least one temporary mobile group identity, TMGI, associated with at least one multicast broadcast service, MBS, session ongoing at a neighboring access node and, for each of the at least one TMGI, at least one indication indicating at least one of:

whether reduced capability terminal devices are supported for a TMGI at the neighboring access node, at least one type of reduced capability terminal device supported for the TMGI at the neighboring access node, or at least one size of CFRs used for the TMGI at the neighboring access node;

transmitting, to a terminal device, neighbor cell frequency information comprising a mapping between at least one neighbor cell frequency and at least one FSAI for the at least one MBS session, wherein a neighbor cell frequency is an operational frequency of a neighbor cell of a serving cell provided by the apparatus and the neighbor cell frequency information is based on the at least one TMGI, the at least one indication and a mapping between the at least one TMGI for the at least one MBS session and the at least one FSAI; and transmitting, to the terminal device, at least one indication for at least one neighbor cell provided by the one or more neighboring access nodes, wherein the at least one indication indicates, per neighbor cell (or per at least one neighbor cell), at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFRs, usable for the at least one FSAI or the at least one MBS session.

Embodiments as described may also be carried out, fully or at least in part, in the form of a computer process defined by a computer program or portions thereof. Embodiments of the methods described in connection with FIGS. 2 to 5, 6A, 6B and 7 to 12 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor.

The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

According to an embodiment, there is provided a non-transitory computer readable medium having stored thereon instructions that, when executed by a computing device, cause the computing device to perform:

receiving a service announcement of a multicast broadcast service, MBS, wherein the service announcement comprises:

at least one frequency selection area identity, FSAI and at least one indication indicating that the at least one FSAI is defined for reduced capability terminal devices, or at least one frequency and at least one indication indicating that the at least one frequency is defined for reduced capability terminal devices;

wherein the instructions, when executed by the computing device, further cause the computing device to perform a cell reselection process based on cell measurements and the service announcement.

According to an embodiment, there is provided a non-transitory computer readable medium having stored thereon instructions that, when executed by a computing device, cause the computing device to perform:

transmitting a service announcement of a multicast broadcast service, MBS, to at least one terminal device via at least one access node, wherein the service announcement comprises at least one frequency selection area identity, FSAI, and at least one indication indicating that the at least one FSAI is defined for reduced capability terminal devices or at least one frequency defined for reduced capability terminal devices and at least one indication indicating that the at least one frequency is defined for reduced capability terminal devices.

According to an embodiment, there is provided a non-transitory computer readable medium having stored thereon instructions that, when executed by a computing device, cause the computing device to perform:

receiving a broadcast multicast broadcast service, MBS, session setup request of an MBS session from a core network function, wherein the broadcast MBS session setup request comprises at least one frequency selection area identity, FSAI, and at least one indication indicating that the at least one FSAI is defined for reduced capability terminal devices; or receiving a broadcast MBS session setup request of the MBS session from the core network and configuration information from an operations, administration and management, OAM, entity, wherein the broadcast MBS session setup request comprises at least one FSAI and the configuration information comprises at least one indication indicating that the at least one FSAI is defined for reduced capability terminal devices; and wherein the instructions, when executed by the computing device, further cause the computing device to further perform:

triggering transmission of the MBS session within reduced capability common frequency resources, CFRs, based on the at least one FSAI and the at least one indication.

According to an embodiment, there is provided a non-transitory computer readable medium having stored thereon instructions that, when executed by a computing device, cause the computing device to perform:

receiving a multicast broadcast service, MBS, session creation request of an MBS session;

in response to or based on the receiving, generating, for the MBS session, at least one frequency selection area identity, FSAI, defined for reduced capability terminal devices and at least one indication indicating that the at least one FSAI is defined for reduced capability terminal devices; and transmitting a broadcast MBS session setup request of the MBS session to at least one access node, wherein the broadcast MBS session setup request comprises the at least one FSAI and the at least one indication.

The term "non-transitory", as used herein, is a limitation of the medium itself (that is, tangible, not a signal) as opposed to a limitation on data storage persistency (for example, RAM vs. ROM).

According to an embodiment, there is provided a method comprising:

receiving a service announcement of a multicast broadcast service, MBS, wherein the service announcement comprises:

at least one frequency selection area identity, FSAI and at least one indication indicating that the at least one FSAI is defined for reduced capability terminal devices, or at least one frequency and at least one indication indicating that the at least one frequency is defined for reduced capability terminal devices;

wherein the method further comprises performing a cell reselection process based on cell measurements and the service announcement.

According to an embodiment, there is provided a method comprising:

transmitting a service announcement of a multicast broadcast service, MBS, to at least one terminal device via at least one access node, wherein the service announcement comprises at least one frequency selection area identity, FSAI, and at least one indication indicating that the at least one FSAI is defined for reduced capability terminal devices or at least one frequency defined for reduced capability terminal devices and at least one indication indicating that the at least one frequency is defined for reduced capability terminal devices.

According to an embodiment, there is provided a method comprising:

receiving a broadcast multicast broadcast service, MBS, session setup request of an MBS session from a core network function, wherein the broadcast MBS session setup request comprises at least one frequency selection area identity, FSAI, and at least one indication indicating that the at least one FSAI is defined for reduced capability terminal devices; or receiving a broadcast MBS session setup request of the MBS session from the core network and configuration information from an operations, administration and management, OAM, entity, wherein the broadcast MBS session setup request comprises at least one FSAI and the configuration information comprises at least one indication indicating that the at least one FSAI is defined for reduced capability terminal devices; and wherein the method further comprises:

triggering transmission of the MBS session within reduced capability common frequency resources, CFRs, based on the at least one FSAI and the at least one indication.

According to an embodiment, there is provided a method comprising:

receiving a multicast broadcast service, MBS, session creation request of an MBS session;

in response to or based on the receiving, generating, for the MBS session, at least one frequency selection area identity, FSAI, defined for reduced capability terminal devices and at least one indication indicating that the at least one FSAI is defined for reduced capability terminal devices; and transmitting a broadcast MBS session setup request of the MBS session to at least one access node, wherein the broadcast MBS session setup request comprises the at least one FSAI and the at least one indication.

Example 1: An apparatus comprising: at least one processor; and at least one memory storing instructions that, when executed by the at least one processor, cause the apparatus at least to perform:

receiving neighbor cell frequency information comprising a mapping between at least one neighbor cell frequency and at least one frequency selection area identity, FSAI, for at least one multicast broadcast service, MBS, session, wherein a neighbor cell frequency is an operational frequency of a neighbor cell of a serving cell of the apparatus;

receiving at least one indication indicating, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFR, usable for the at least one FSAI or the at least one MBS session; and performing a cell reselection process based on cell measurements and the neighbor cell frequency information and the at least one indication.

Example 2: The apparatus of example 1, wherein the neighbor cell frequency information and the at least one indication are received in a system information block 21, SIB21, message.

Example 3: The apparatus of example 1 or 2, wherein the apparatus is a reduced capability terminal device.

Example 4: The apparatus of example 3, wherein the at least one indication indicates that reduced capability terminal devices are supported for the at least one FSAI or the at least one MBS session without indicating either of the at least one size of the CFR usable for the at least one FSAI or the at least one MBS session; and the least one type of reduced capability terminal device supported for the at least one FSAI or the at least one MBS session; and wherein the performing of the cell reselection process comprises:

prioritizing, in the cell reselection process, at least one neighbor cell frequency associated with the at least one indication indicating that reduced capability terminal devices are supported for the at least one FSAI or the at least one MBS session.

Example 5: The apparatus of example 3, wherein the at least one indication indicates the at least one size of the CFR usable for the at least one FSAI or the at least one MBS session and/or the at least one type of reduced capability terminal device supported for the at least one FSAI or the at least one MBS session; and wherein the performing of the cell reselection process comprises:

prioritizing, in the cell reselection process, at least one neighbor cell frequency associated with a size of CFR supported by the reduced capability terminal device and/or associated with a type of reduced capability terminal device corresponding to the reduced capability terminal device.

Example 6: The apparatus of example 1 or 2, wherein the apparatus is a non reduced capability terminal device; and wherein the performing of the cell reselection process comprises:

prioritizing, in the cell reselection process, at least one neighbor cell frequency failing to support reduced capability terminal devices based on the at least one indication and the neighbor cell frequency information.

Example 7: The apparatus of any of examples 1 to 6, wherein the at least one memory and the instructions are configured, with the at least one processor, to cause the apparatus to perform, before the receiving of the neighbor cell frequency information:

receiving a service announcement of an MBS session, wherein the service announcement indicates at least one FSAI associated with the MBS session or at least one frequency associated with the MBS session, wherein the performing of the cell reselection process is further based on the service announcement.

Example 8: The apparatus of any of examples 1 to 7, wherein the at least one memory and the instructions are configured, with the at least one processor, to cause the apparatus to perform:

operating in a radio resource control, RRC, idle or inactive state during the performing of the cell reselection process.

Example 9: An apparatus comprising:

at least one processor; and at least one memory storing instructions that, when executed by the at least one processor, cause the apparatus at least to perform:

receiving, from at least one neighboring access node, at least one indication indicating at least one of:

whether reduced capability terminal devices are supported for at least one frequency selection area identity, FSAI, or at least one multicast broadcast service, MBS, session at a neighboring access node among the at least one neighboring access node, at least one type of reduced capability terminal device supported for at least one FSAI or at least one MBS session at the neighboring access node, at least one size of common frequency resources, CFRs, used for at least one FSAI or at least one MBS session at the neighboring access node, at least one type of the CFRs being currently in use by the neighboring access node for at least one FSAI or at least one MBS session;

transmitting, to a terminal device, neighbor cell frequency information comprising a mapping between at least one neighbor cell frequency and at least one FSAI for at least one MBS session, wherein a neighbor cell frequency is an operational frequency of a neighbor cell of a serving cell provided by the apparatus; and transmitting, to the terminal device, at least one indication indicating, per at least one neighbor cell provided by the at least one neighboring access node, at least one of:

whether reduced capability terminal devices are supported for the at least one FSAI or the at least one MBS session, at least one type of reduced capability terminal device supported for the at least one FSAI or the at least one MBS session, or at least one size of CFRs usable for the at least one FSAI or the at least one MBS session.

Example 10: The apparatus of example 9, wherein the at least one memory and the instructions are configured, with the at least one processor, to cause the apparatus to perform:

receiving a broadcast multicast broadcast service, MBS, session setup request of an MBS session from a core network function, wherein the broadcast MBS session setup request comprises at least one FSAI associated with the MBS session.

Example 11: The apparatus of example 9 or 10, wherein the at least one memory and the instructions are configured, with the at least one processor, to cause the apparatus to perform:

receiving configuration information from an operations, administration and management, OAM, entity, wherein the configuration information comprises at least one indication indicating that the at least one FSAI associated with the MBS session is defined for reduced capability terminal devices; and triggering transmission of the MBS session within CFRs defined for reduced capability terminal devices based on the configuration information.

Example 12: The apparatus of example 10 or 11, wherein the at least one memory and the instructions are configured, with the at least one processor, to cause the apparatus to perform:

transmitting, to the at least one neighboring access node, at least one indication indicating at least one of:

whether reduced capability terminal devices are supported for the at least one FSAI or the at least one MBS session at the apparatus, at least one type of reduced capability terminal device supported for the at least one FSAI or the at least one MBS session at the apparatus, or at least one size of CFRs used for the at least one FSAI or the at least one MBS session at the apparatus, or a type of the CFRs being currently in use by the apparatus for the at least one FSAI or the at least one MBS session.

Example 13: an apparatus comprising:

at least one processor; and at least one memory storing instructions that, when executed by the at least one processor, cause the apparatus at least to perform:

receiving, from each of one or more neighboring access nodes, at least one temporary mobile group identity, TMGI, associated with at least one multicast broadcast service, MBS, session ongoing at a neighboring access node and, for each of the at least one TMGI, at least one indication indicating at least one of:

whether reduced capability terminal devices are supported for a TMGI at the neighboring access node, at least one type of reduced capability terminal device supported for the TMGI at the neighboring access node, or at least one size of CFRs used for the TMGI at the neighboring access node;

transmitting, to a terminal device, neighbor cell frequency information comprising a mapping between at least one neighbor cell frequency and at least one FSAI for the at least one MBS session, wherein a neighbor cell frequency is an operational frequency of a neighbor cell of a serving cell provided by the apparatus and the neighbor cell frequency information is based on the at least one TMGI, the at least one indication and a mapping between the at least one TMGI for the at least one MBS session and the at least one FSAI; and transmitting, to the terminal device, at least one indication for at least one neighbor cell provided by the one or more neighboring access nodes, wherein the at least one indication indicates, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFRs, usable for the at least one FSAI or the at least one MBS session.

Example 14: The apparatus of example 13, wherein the at least one memory and the instructions are configured, with the at least one processor, to cause the apparatus to perform:

transmitting, to each of the one or more neighboring access nodes, at least one TMGI associated with at least one MBS session ongoing at the apparatus and, for each of the at least one TMGI associated with the at least one MBS session ongoing at the apparatus, at least one indication indicating at least one of:

whether reduced capability terminal devices are supported for a TMGI at the apparatus, at least one type of reduced capability terminal device supported for the TMGI at the apparatus, or at least one size of CFRs used for the TMGI at the apparatus.

Example 15: The apparatus of example 13, wherein the at least one memory and the instructions are configured, with the at least one processor, to cause the apparatus to perform, before the transmission of the neighbor cell frequency information:

receiving a broadcast MBS session setup request of an MBS session from a core network function, wherein the broadcast MBS session setup request comprises at least one FSAI associated with the MBS session; and determining the mapping between the at least one TMGI for the at least one MBS session and the at least one FSAI based on the broadcast MBS session setup request and the at least one TMGI and the at least one indication received from the one or more neighboring access nodes.

Example 16: The apparatus of example 15, wherein the at least one memory and the instructions are configured, with the at least one processor, to cause the apparatus to perform:

receiving configuration information from an operations, administration and management, OAM, entity, wherein the configuration information comprises at least one indication indicating that the at least one FSAI associated with the MBS session supported by the apparatus is defined for reduced capability terminal devices; and triggering transmission of the MBS session within CFRs defined for reduced capability terminal devices based on the configuration information.

Example 17: The apparatus of any of examples 9 to 16, wherein the neighbor cell frequency information and the at least one indication are transmitted to the terminal device in a system information block 21, SIB21, message.

Example 18: A method comprising:

receiving neighbor cell frequency information comprising a mapping between at least one neighbor cell frequency and at least one frequency selection area identity, FSAI, for at least one multicast broadcast service, MBS, session, wherein a neighbor cell frequency is an operational frequency of a neighbor cell of a serving cell of the apparatus;

receiving at least one indication indicating, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFR, usable for the at least one FSAI or the at least one MBS session; and performing a cell reselection process based on cell measurements and the neighbor cell frequency information and the at least one indication Example 19: A method comprising:

receiving, from at least one neighboring access node, at least one indication indicating at least one of:

whether reduced capability terminal devices are supported for at least one frequency selection area identity, FSAI, or at least one multicast broadcast service, MBS, session at a neighboring access node among the at least one neighboring access node, at least one type of reduced capability terminal device supported for at least one FSAI or at least one MBS session at the neighboring access node, at least one size of common frequency resources, CFRs, used for at least one FSAI or at least one MBS session at the neighboring access node, at least one type of the CFRs being currently in use by the neighboring access node for at least one FSAI or at least one MBS session;

transmitting, to a terminal device, neighbor cell frequency information comprising a mapping between at least one neighbor cell frequency and at least one FSAI for at least one MBS session, wherein a neighbor cell frequency is an operational frequency of a neighbor cell of a serving cell provided by the apparatus; and transmitting, to the terminal device, at least one indication indicating, per at least one neighbor cell provided by the at least one neighboring access node, at least one of:

whether reduced capability terminal devices are supported for the at least one FSAI or the at least one MBS session, at least one type of reduced capability terminal device supported for the at least one FSAI or the at least one MBS session, or at least one size of CFRs usable for the at least one FSAI or the at least one MBS session.

Example 20: A method comprising:

receiving, from each of one or more neighboring access nodes, at least one temporary mobile group identity, TMGI, associated with at least one multicast broadcast service, MBS, session ongoing at a neighboring access node and, for each of the at least one TMGI, at least one indication indicating at least one of:

whether reduced capability terminal devices are supported for a TMGI at the neighboring access node, at least one type of reduced capability terminal device supported for the TMGI at the neighboring access node, or at least one size of CFRs used for the TMGI at the neighboring access node;

transmitting, to a terminal device, neighbor cell frequency information comprising a mapping between at least one neighbor cell frequency and at least one FSAI for the at least one MBS session, wherein a neighbor cell frequency is an operational frequency of a neighbor cell of a serving cell provided by the apparatus and the neighbor cell frequency information is based on the at least one TMGI, the at least one indication and a mapping between the at least one TMGI for the at least one MBS session and the at least one FSAI; and transmitting, to the terminal device, at least one indication for at least one neighbor cell provided by the one or more neighboring access nodes, wherein the at least one indication indicates, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFRs, usable for the at least one FSAI or the at least one MBS session.

Example 21: A non-transitory computer readable medium having stored thereon instructions that, when executed by a computing device, cause the computing device to perform:

receiving neighbor cell frequency information comprising a mapping between at least one neighbor cell frequency and at least one frequency selection area identity, FSAI, for at least one multicast broadcast service, MBS, session, wherein a neighbor cell frequency is an operational frequency of a neighbor cell of a serving cell of the apparatus;

receiving at least one indication indicating, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFR, usable for the at least one FSAI or the at least one MBS session; and performing a cell reselection process based on cell measurements and the neighbor cell frequency information and the at least one indication.

Example 22: A non-transitory computer readable medium having stored thereon instructions that, when executed by a computing device, cause the computing device to perform:

receiving, from at least one neighboring access node, at least one indication indicating at least one of:

whether reduced capability terminal devices are supported for at least one frequency selection area identity, FSAI, or at least one multicast broadcast service, MBS, session at a neighboring access node among the at least one neighboring access node, at least one type of reduced capability terminal device supported for at least one FSAI or at least one MBS session at the neighboring access node, at least one size of common frequency resources, CFRs, used for at least one FSAI or at least one MBS session at the neighboring access node, at least one type of the CFRs being currently in use by the neighboring access node for at least one FSAI or at least one MBS session;

transmitting, to a terminal device, neighbor cell frequency information comprising a mapping between at least one neighbor cell frequency and at least one FSAI for at least one MBS session, wherein a neighbor cell frequency is an operational frequency of a neighbor cell of a serving cell provided by the apparatus; and transmitting, to the terminal device, at least one indication indicating, per at least one neighbor cell provided by the at least one neighboring access node, at least one of:

whether reduced capability terminal devices are supported for the at least one FSAI or the at least one MBS session, at least one type of reduced capability terminal device supported for the at least one FSAI or the at least one MBS session, or at least one size of CFRs usable for the at least one FSAI or the at least one MBS session.

Example 23: A non-transitory computer readable medium having stored thereon instructions that, when executed by a computing device, cause the computing device to perform:

receiving, from each of one or more neighboring access nodes, at least one temporary mobile group identity, TMGI, associated with at least one multicast broadcast service, MBS, session ongoing at a neighboring access node and, for each of the at least one TMGI, at least one indication indicating at least one of:

whether reduced capability terminal devices are supported for a TMGI at the neighboring access node, at least one type of reduced capability terminal device supported for the TMGI at the neighboring access node, or at least one size of CFRs used for the TMGI at the neighboring access node;

transmitting, to a terminal device, neighbor cell frequency information comprising a mapping between at least one neighbor cell frequency and at least one FSAI for the at least one MBS session, wherein a neighbor cell frequency is an operational frequency of a neighbor cell of a serving cell provided by the apparatus and the neighbor cell frequency information is based on the at least one TMGI, the at least one indication and a mapping between the at least one TMGI for the at least one MBS session and the at least one FSAI; and transmitting, to the terminal device, at least one indication for at least one neighbor cell provided by the one or more neighboring access nodes, wherein the at least one indication indicates, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFRs, usable for the at least one FSAI or the at least one MBS session.

Additional or alternative set of numbered examples:

Example 1: An apparatus comprising: at least one processor; and at least one memory storing instructions that, when executed by the at least one processor, cause the apparatus at least to perform: receiving neighbor cell frequency information comprising a mapping between at least one neighbor cell frequency and at least one frequency selection area identity, FSAI, for at least one multicast broadcast service, MBS, session, wherein a neighbor cell frequency is an operational frequency of a neighbor cell of a serving cell of the apparatus; receiving at least one indication indicating, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFR, usable for the at least one FSAI or the at least one MBS session; and performing a cell reselection process based on cell measurements and the neighbor cell frequency information and the at least one indication.

Example 2. The apparatus of example 1, wherein the neighbor cell frequency information and the at least one indication are received in a system information block 21, SIB21, message.

Example 3. The apparatus according to any preceding example, wherein the apparatus is a reduced capability terminal device.

Example 4. The apparatus of example 3, wherein the at least one indication indicates that reduced capability terminal devices are supported for the at least one FSAI or the at least one MBS session without indicating either of the at least one size of the CFR usable for the at least one FSAI or the at least one MBS session; and the least one type of reduced capability terminal device supported for the at least one FSAI or the at least one MBS session; and wherein the performing of the cell reselection process comprises: prioritizing, in the cell reselection process, at least one neighbor cell frequency associated with the at least one indication indicating that reduced capability terminal devices are supported for the at least one FSAI or the at least one MBS session.

Example 5. The apparatus of example 3, wherein the at least one indication indicates the at least one size of the CFR usable for the at least one FSAI or the at least one MBS session and/or the at least one type of reduced capability terminal device supported for the at least one FSAI or the at least one MBS session; and wherein the performing of the cell reselection process comprises: prioritizing, in the cell reselection process, at least one neighbor cell frequency associated with a size of CFR supported by the reduced capability terminal device and/or associated with a type of reduced capability terminal device corresponding to the reduced capability terminal device.

Example 6. The apparatus of example 1 or 2, wherein the apparatus is a non reduced capability terminal device; and wherein the performing of the cell reselection process comprises: prioritizing, in the cell reselection process, at least one neighbor cell frequency failing to support reduced capability terminal devices based on the at least one indication and the neighbor cell frequency information.

Example 7. The apparatus according to any preceding example, wherein the at least one memory and the instructions are configured, with the at least one processor, to cause the apparatus to perform, before the receiving of the neighbor cell frequency information: receiving a service announcement of an MBS session, wherein the service announcement indicates at least one FSAI associated with the MBS session or at least one frequency associated with the MBS session, wherein the performing of the cell reselection process is further based on the service announcement.

Example 8. The apparatus according to any preceding example, wherein the at least one memory and the instructions are configured, with the at least one processor, to cause the apparatus to perform: operating in a radio resource control, RRC, idle or inactive state during the performing of the cell reselection process.

Example 9. An apparatus comprising: at least one processor; and at least one memory storing instructions that, when executed by the at least one processor, cause the apparatus at least to perform: receiving, from at least one neighboring access node, at least one indication indicating at least one of:

whether reduced capability terminal devices are supported for at least one frequency selection area identity, FSAI, or at least one multicast broadcast service, MBS, session at a neighboring access node among the at least one neighboring access node, at least one type of reduced capability terminal device supported for at least one FSAI or at least one MBS session at the neighboring access node, at least one size of common frequency resources, CFRs, used for at least one FSAI or at least one MBS session at the neighboring access node, or at least one type of the CFRs being currently in use by the neighboring access node for at least one FSAI or at least one MBS session;

transmitting, to a terminal device, neighbor cell frequency information comprising a mapping between at least one neighbor cell frequency and at least one FSAI for at least one MBS session, wherein a neighbor cell frequency is an operational frequency of a neighbor cell of a serving cell provided by the apparatus; and transmitting, to the terminal device, at least one indication indicating, per at least one neighbor cell provided by the at least one neighboring access node, at least one of:

whether reduced capability terminal devices are supported for the at least one FSAI or the at least one MBS session, at least one type of reduced capability terminal device supported for the at least one FSAI or the at least one MBS session, or at least one size of CFRs usable for the at least one FSAI or the at least one MBS session.

Example 10. The apparatus of example 9, wherein the at least one memory and the instructions are configured, with the at least one processor, to cause the apparatus to perform: receiving a broadcast multicast broadcast service, MBS, session setup request of an MBS session from a core network function, wherein the broadcast MBS session setup request comprises at least one FSAI associated with the MBS session.

Example 11. The apparatus of example 10, wherein the at least one memory and the instructions are configured, with the at least one processor, to cause the apparatus to perform: receiving configuration information from an operations, administration and management, OAM, entity, wherein the configuration information comprises at least one indication indicating that the at least one FSAI associated with the MBS session is defined for reduced capability terminal devices; and triggering transmission of the MBS session within CFRs defined for reduced capability terminal devices based on the configuration information.

Example 12. The apparatus according to any of examples 9 to 11, wherein the at least one memory and the instructions are configured, with the at least one processor, to cause the apparatus to perform: transmitting, to the at least one neighboring access node, at least one indication indicating at least one of:

whether reduced capability terminal devices are supported for the at least one FSAI or the at least one MBS session at the apparatus, at least one type of reduced capability terminal device supported for the at least one FSAI or the at least one MBS session at the apparatus, or at least one size of CFRs used for the at least one FSAI or the at least one MBS session at the apparatus, or a type of the CFRs being currently in use by the apparatus for the at least one FSAI or the at least one MBS session.

Example 13. An apparatus comprising: at least one processor; and at least one memory storing instructions that, when executed by the at least one processor, cause the apparatus at least to perform: receiving, from each of one or more neighboring access nodes, at least one temporary mobile group identity, TMGI, associated with at least one multicast broadcast service, MBS, session ongoing at a neighboring access node and, for each of the at least one TMGI, at least one indication indicating at least one of:

whether reduced capability terminal devices are supported for a TMGI at the neighboring access node, at least one type of reduced capability terminal device supported for the TMGI at the neighboring access node, or at least one size of CFRs used for the TMGI at the neighboring access node;

transmitting, to a terminal device, neighbor cell frequency information comprising a mapping between at least one neighbor cell frequency and at least one FSAI for the at least one MBS session, wherein a neighbor cell frequency is an operational frequency of a neighbor cell of a serving cell provided by the apparatus and the neighbor cell frequency information is based on the at least one TMGI, the at least one indication and a mapping between the at least one TMGI for the at least one MBS session and the at least one FSAI; and transmitting, to the terminal device, at least one indication for at least one neighbor cell provided by the one or more neighboring access nodes, wherein the at least one indication indicates, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFRs, usable for the at least one FSAI or the at least one MBS session.

Example 14. The apparatus of example 13, wherein the at least one memory and the instructions are configured, with the at least one processor, to cause the apparatus to perform: transmitting, to each of the one or more neighboring access nodes, at least one TMGI associated with at least one MBS session ongoing at the apparatus and, for each of the at least one TMGI associated with the at least one MBS session ongoing at the apparatus, at least one indication indicating at least one of:

whether reduced capability terminal devices are supported for a TMGI at the apparatus, at least one type of reduced capability terminal device supported for the TMGI at the apparatus, or at least one size of CFRs used for the TMGI at the apparatus.

Example 15. The apparatus of example 13 or 14, wherein the at least one memory and the instructions are configured, with the at least one processor, to cause the apparatus to perform, before the transmission of the neighbor cell frequency information: receiving a broadcast MBS session setup request of an MBS session from a core network function, wherein the broadcast MBS session setup request comprises at least one FSAI associated with the MBS session; and determining the mapping between the at least one TMGI for the at least one MBS session and the at least one FSAI based on the broadcast MBS session setup request and the at least one TMGI and the at least one indication received from the one or more neighboring access nodes.

Example 16. The apparatus of example 15, wherein the at least one memory and the instructions are configured, with the at least one processor, to cause the apparatus to perform: receiving configuration information from an operations, administration and management, OAM, entity, wherein the configuration information comprises at least one indication indicating that the at least one FSAI associated with the MBS session supported by the apparatus is defined for reduced capability terminal devices; and triggering transmission of the MBS session within CFRs defined for reduced capability terminal devices based on the configuration information.

Example 17. The apparatus according to any of examples 9 to 16, wherein the neighbor cell frequency information and the at least one indication are transmitted to the terminal device in a system information block 21, SIB21, message.

Example 18. A method comprising: receiving neighbor cell frequency information comprising a mapping between at least one neighbor cell frequency and at least one frequency selection area identity, FSAI, for at least one multicast broadcast service, MBS, session, wherein a neighbor cell frequency is an operational frequency of a neighbor cell of a serving cell of the apparatus; receiving at least one indication indicating, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFR, usable for the at least one FSAI or the at least one MBS session; and performing a cell reselection process based on cell measurements and the neighbor cell frequency information and the at least one indication.

Example 19. A method comprising:

receiving, from at least one neighboring access node, at least one indication indicating at least one of:

whether reduced capability terminal devices are supported for at least one frequency selection area identity, FSAI, or at least one multicast broadcast service, MBS, session at a neighboring access node among the at least one neighboring access node, at least one type of reduced capability terminal device supported for at least one FSAI or at least one MBS session at the neighboring access node, at least one size of common frequency resources, CFRs, used for at least one FSAI or at least one MBS session at the neighboring access node, at least one type of the CFRs being currently in use by the neighboring access node for at least one FSAI or at least one MBS session;

transmitting, to a terminal device, neighbor cell frequency information comprising a mapping between at least one neighbor cell frequency and at least one FSAI for at least one MBS session, wherein a neighbor cell frequency is an operational frequency of a neighbor cell of a serving cell provided by the apparatus; and transmitting, to the terminal device, at least one indication indicating, per at least one neighbor cell provided by the at least one neighboring access node, at least one of:

whether reduced capability terminal devices are supported for the at least one FSAI or the at least one MBS session, at least one type of reduced capability terminal device supported for the at least one FSAI or the at least one MBS session, or at least one size of CFRs usable for the at least one FSAI or the at least one MBS session.

Example 20. A method comprising: receiving, from each of one or more neighboring access nodes, at least one temporary mobile group identity, TMGI, associated with at least one multicast broadcast service, MBS, session ongoing at a neighboring access node and, for each of the at least one TMGI, at least one indication indicating at least one of:

whether reduced capability terminal devices are supported for a TMGI at the neighboring access node, at least one type of reduced capability terminal device supported for the TMGI at the neighboring access node, or at least one size of CFRs used for the TMGI at the neighboring access node;

transmitting, to a terminal device, neighbor cell frequency information comprising a mapping between at least one neighbor cell frequency and at least one FSAI for the at least one MBS session, wherein a neighbor cell frequency is an operational frequency of a neighbor cell of a serving cell provided by the apparatus and the neighbor cell frequency information is based on the at least one TMGI, the at least one indication and a mapping between the at least one TMGI for the at least one MBS session and the at least one FSAI; and transmitting, to the terminal device, at least one indication for at least one neighbor cell provided by the one or more neighboring access nodes, wherein the at least one indication indicates, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFRs, usable for the at least one FSAI or the at least one MBS session Example 21. A non-transitory computer readable medium having stored thereon instructions that, when executed by a computing device, cause the computing device to perform: receiving neighbor cell frequency information comprising a mapping between at least one neighbor cell frequency and at least one frequency selection area identity, FSAI, for at least one multicast broadcast service, MBS, session, wherein a neighbor cell frequency is an operational frequency of a neighbor cell of a serving cell of the apparatus; receiving at least one indication indicating, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFR, usable for the at least one FSAI or the at least one MBS session; and performing a cell reselection process based on cell measurements and the neighbor cell frequency information and the at least one indication.

Example 22. A non-transitory computer readable medium having stored thereon instructions that, when executed by a computing device, cause the computing device to perform: receiving, from at least one neighboring access node, at least one indication indicating at least one of:

whether reduced capability terminal devices are supported for at least one frequency selection area identity, FSAI, or at least one multicast broadcast service, MBS, session at a neighboring access node among the at least one neighboring access node, at least one type of reduced capability terminal device supported for at least one FSAI or at least one MBS session at the neighboring access node, at least one size of common frequency resources, CFRs, used for at least one FSAI or at least one MBS session at the neighboring access node, at least one type of the CFRs being currently in use by the neighboring access node for at least one FSAI or at least one MBS session;

transmitting, to a terminal device, neighbor cell frequency information comprising a mapping between at least one neighbor cell frequency and at least one FSAI for at least one MBS session, wherein a neighbor cell frequency is an operational frequency of a neighbor cell of a serving cell provided by the apparatus; and transmitting, to the terminal device, at least one indication indicating, per at least one neighbor cell provided by the at least one neighboring access node, at least one of:

whether reduced capability terminal devices are supported for the at least one FSAI or the at least one MBS session, at least one type of reduced capability terminal device supported for the at least one FSAI or the at least one MBS session, or at least one size of CFRs usable for the at least one FSAI or the at least one MBS session.

Example 23. A non-transitory computer readable medium having stored thereon instructions that, when executed by a computing device, cause the computing device to perform: receiving, from each of one or more neighboring access nodes, at least one temporary mobile group identity, TMGI, associated with at least one multicast broadcast service, MBS, session ongoing at a neighboring access node and, for each of the at least one TMGI, at least one indication indicating at least one of:

whether reduced capability terminal devices are supported for a TMGI at the neighboring access node, at least one type of reduced capability terminal device supported for the TMGI at the neighboring access node, or at least one size of CFRs used for the TMGI at the neighboring access node;

transmitting, to a terminal device, neighbor cell frequency information comprising a mapping between at least one neighbor cell frequency and at least one FSAI for the at least one MBS session, wherein a neighbor cell frequency is an operational frequency of a neighbor cell of a serving cell provided by the apparatus and the neighbor cell frequency information is based on the at least one TMGI, the at least one indication and a mapping between the at least one TMGI for the at least one MBS session and the at least one FSAI; and transmitting, to the terminal device, at least one indication for at least one neighbor cell provided by the one or more neighboring access nodes, wherein the at least one indication indicates, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFRs, usable for the at least one FSAI or the at least one MBS session.

Reference throughout this specification to one embodiment or an embodiment means that a particular feature, structure, or characteristic described in connection with the embodiment is included in at least one embodiment of the present solution. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present solution may be referred to herein along with alternatives for the various components thereof. It is understood that such embodiments, examples, and alternatives are not to be construed as de facto equivalents of one another, but are to be considered as separate and autonomous representations of the present solution.

Even though embodiments have been described above with reference to examples according to the accompanying drawings, it is clear that the embodiments are not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

INDUSTRIAL APPLICABILITY

At least some embodiments find industrial application in wireless communications.

The invention claimed is:

1. An apparatus comprising:
   at least one processor; and
   at least one memory storing instructions that, when executed by the at least one processor, cause the apparatus at least to perform:
   receiving a service announcement of a multicast broadcast service, MBS;
   receiving, in the service announcement, at least one indication explicitly indicating support for all or at least some reduced capability terminal devices for the MBS; and
   performing a cell reselection process based on cell measurements and the at least one indication explicitly indicating support for all or at least some reduced capability terminal devices for the MBS received in the service announcement.

2. The apparatus of claim 1, wherein
   the service announcement comprises at least one frequency selection area identity, FSAI, associated with the MBS and the at least one indication indicating that the at least one FSAI is defined for reduced capability terminal devices, and/or
   the service announcement comprises at least one frequency associated with the MBS and the at least one indication indicating that the at least one frequency is defined for reduced capability terminal devices,
   the performing of the cell reselection process being further based on the at least one FSAI and/or the at least one frequency.

3. The apparatus of claim 2, wherein the apparatus is a reduced capability terminal device; and wherein performing of the cell reselection process comprises:
   prioritizing, in the cell reselection process, frequencies associated with the at least one FSAI or the at least one frequency indicated as defined for reduced capability terminal devices.

4. The apparatus of claim 2, wherein the apparatus is a reduced capability terminal device; and wherein the service announcement further comprises one or more additional FSAIs or one or more additional frequencies that do not indicate that the one or more additional FSAIs or the one or more additional frequencies are defined for reduced capability terminal device; and wherein performing of the cell reselection process comprises:
   prioritizing, in the cell reselection process, the frequencies associated with the at least one FSAI or the at least one frequency indicated as defined for reduced capability terminal devices at least over frequencies associated with the one or more additional FSAIs or one or more additional frequencies which are not indicated as defined for reduced capability terminal devices.

5. The apparatus of claim 2, wherein the apparatus is a non reduced capability terminal device, the service announcement further comprises one or more additional FSAIs or one or more additional frequencies that do not indicate that the one or more additional FSAIs or the one or more additional frequencies are defined for reduced capability terminal device; and wherein the performing of the cell reselection process comprises:
   prioritizing, in the cell reselection process, frequencies associated with the one or more additional FSAIs or the one or more additional frequencies without being indicated as defined for reduced capability terminal devices over frequencies associated with the at least one FSAI or the at least one frequency indicated as defined for reduced capability terminal devices.

6. The apparatus of claim 2, wherein the service announcement further comprises, for at least one of the at least one FSAI or the at least one frequency, information on at least one bandwidth limitation condition with which the at least one FSAI or at least one frequency indicated as defined for reduced capability terminal devices complies.

7. The apparatus of claim 2, wherein the service announcement further comprises, for at least one of the at least one FSAI or the at least one frequency, information on at least one bandwidth limitation condition with which the at least one FSAI or at least one frequency indicated as defined for reduced capability terminal devices complies; and
   wherein the at least one bandwidth limitation condition comprises a condition for a bandwidth size and/or condition for a type of a reduced capacity terminal device.

8. The apparatus of claim 2, wherein the service announcement further comprises, for at least one of the at least one FSAI or the at least one frequency, information on at least one bandwidth limitation condition with which the at least one FSAI or at least one frequency indicated as defined for reduced capability terminal devices complies; and wherein the apparatus is a reduced capability terminal device; and wherein the performing of the cell reselection process comprises:

determining, for the at least one frequency or the at least one FSAI associated with the at least one bandwidth limitation condition, whether the reduced capability terminal device meets the at least one bandwidth limitation condition; and prioritizing, in the cell reselection process, frequencies associated with at least one FSAI or at least one frequency for which the reduced capability terminal device meets the at least one bandwidth limitation condition.

9. The apparatus according to claim 2, wherein the service announcement comprises the at least one FSAI and the at least one indication indicating that the at least one FSAI is defined for reduced capability terminal devices and the at least one memory and the instructions are configured, with the at least one processor, to cause the apparatus to perform:

receiving, in at least one message following the service announcement, a mapping between the at least one FSAI defined in the service announcement and at least one frequency; and performing the cell reselection process further based on the mapping.

10. The apparatus of claim 1, wherein the at least one memory and the instructions are configured, with the at least one processor, to cause the apparatus to further perform:

receiving neighbor cell frequency information comprising a mapping between at least one neighbor cell frequency and at least one FSAI for at least one MBS session of the MBS, wherein a neighbor cell frequency is an operational frequency of a neighbor cell of a serving cell of the apparatus and the performing of the cell reselection is further based on the neighbor cell frequency information, wherein at least one message following the service announcement comprises the at least one indication indicating, per at least one neighbor cell, support for said all or at least some reduced capability terminal devices for the MBS in terms of support for the at least one FSAI or the at least one MBS session.

11. The apparatus of claim 10, wherein the at least one indication indicates, per at least one neighbor cell, at least one of:

whether reduced capability terminal devices are supported for the at least one FSAI or the at least one MBS session, at least one type of reduced capability terminal device supported for the at least one FSAI or the at least one MBS session, or at least one size of common frequency resources, CFRs, usable for the at least one FSAI or the at least one MBS session.

12. The apparatus of claim 10, wherein the apparatus is a reduced capability terminal device.

13. The apparatus of claim 10, wherein the apparatus is a reduced capability terminal device; and wherein the at least one indication indicates that reduced capability terminal devices are supported for the at least one FSAI or the at least one MBS session without indicating either of the at least one size of the CFRs usable for the at least one FSAI or the at least one MBS session; and the least one type of reduced capability terminal device supported for the at least one FSAI or the at least one MBS session; and wherein the performing of the cell reselection process comprises:

prioritizing, in the cell reselection process, at least one neighbor cell frequency associated with the at least one indication indicating that reduced capability terminal devices are supported for the at least one FSAI or the at least one MBS session.

14. The apparatus of claim 10, wherein the apparatus is a reduced capability terminal device; and wherein the at least one indication indicates the at least one size of the CFRs usable for the at least one FSAI or the at least one MBS session and/or the at least one type of reduced capability terminal device supported for the at least one FSAI or the at least one MBS session; and wherein the performing of the cell reselection process comprises:

prioritizing, in the cell reselection process, at least one neighbor cell frequency associated with a size of CFR supported by the reduced capability terminal device and/or associated with a type of reduced capability terminal device corresponding to the reduced capability terminal device.

15. The apparatus of claim 10, wherein the apparatus is a non reduced capability terminal device; and wherein the performing of the cell reselection process comprises:

prioritizing, in the cell reselection process, at least one neighbor cell frequency failing to support reduced capability terminal devices based on the at least one indication and the neighbor cell frequency information.

16. The apparatus of claim 1, wherein the service announcement indicates at least one FSAI associated with the MBS session or at least one frequency associated with the MBS session, wherein the performing of the cell reselection process is further based on the service announcement.

17. The apparatus according to claim 10, wherein the at least one message is or comprises a system information block 21, SIB21, message.

18. The apparatus according to claim 1, wherein the at least one memory and the instructions are configured, with the at least one processor, to cause the apparatus to perform:

operating in a radio resource control, RRC, idle or inactive state during the performing of the cell reselection process.

19. A method comprising:

receiving, by a reduced capability terminal device, a service announcement of a multicast broadcast service, MBS;

receiving, by the reduced capability terminal device, in the service announcement, at least one indication explicitly indicating support for all or at least some reduced capability terminal devices for the MBS; and performing, by the reduced capability terminal device, a cell reselection process based on cell measurements and the at least one indication explicitly indicating support for all or at least some reduced capability terminal devices for the MBS received in the service announcement.

20. A non-transitory computer readable medium having stored thereon instructions that, when executed by a computing device, cause the computing device to perform:

receiving a service announcement of a multicast broadcast service, MBS;

receiving, in the service announcement, at least one indication explicitly indicating support for all or at least some reduced capability terminal devices for the MBS; and performing a cell reselection process based on cell measurements and the at least one indication explicitly indicating support for all or at least some reduced capability terminal devices for the MBS received in the service announcement.

\* \* \* \* \*